(12) United States Patent
Dai

(10) Patent No.: US 9,691,096 B1
(45) Date of Patent: Jun. 27, 2017

(54) IDENTIFYING ITEM RECOMMENDATIONS THROUGH RECOGNIZED NAVIGATIONAL PATTERNS

(71) Applicant: Amazon Technologies, Inc., Reno, NV (US)

(72) Inventor: Siyang Dai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 14/027,848

(22) Filed: Sep. 16, 2013

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC .................................. G06Q 30/0631
See application file for complete search history.

(56) References Cited

U.S. PATENT DOCUMENTS

2008/0250026 A1* 10/2008 Linden et al. ................... 707/10
2010/0274808 A1* 10/2010 Scholz et al. ................. 707/776

OTHER PUBLICATIONS

Chou, Pao Hua; Li, Pi Hsiang; Chen, Kuang Ku; Wu, Meng Jiun; Novoa, Kevin. Expert Systems With Applications. 37.4 (Apr. 2010): 2898-2910.*

* cited by examiner

*Primary Examiner* — William Allen
*Assistant Examiner* — Anand Loharikar
(74) *Attorney, Agent, or Firm* — Athorus, PLLC

(57) ABSTRACT

Customer interactions with one or more pages associated with an online marketplace may be aggregated into historical navigational patterns, which may be associated with one or more items available for purchase at the online marketplace. Where a series or sequence of customer interactions is subsequently received from a customer, such interactions may also be aggregated into a pattern, which may be compared to one or more of the historical navigational patterns. An item recommendation may be identified for the customer based at least in part on the comparison of the received navigational pattern to one or more of the historical navigational patterns. The item recommendation may include an item previously purchased following one of the historical navigational patterns, or an item related to one or more such items.

10 Claims, 13 Drawing Sheets

IDENTIFYING ITEM RECOMMENDATIONS THROUGH RECOGNIZED NAVIGATIONAL PATTERNS

BACKGROUND

Today, online marketplaces routinely provide customers with modern, efficient and versatile interfaces that permit such customers to search for and identify desirable items (e.g., goods, products, services, information or media of any type or form) by a variety of means. For example, an online marketplace may provide a text box into which a customer may enter keywords. Upon receiving one or more such keywords, the online marketplace may conduct a search for items relating to the keywords, and present a web page that includes a list of such items to the customer for his or her review. Similarly, an online marketplace may provide a series or array of hyperlinked text elements, images or features that are each associated with a category or group of items. Upon receiving a selection of one of the text elements, images or features, the online marketplace may present a web page that includes a list of items corresponding to the selected element, image or feature to the customer. An online marketplace may also display web pages which include advertisements, customer ratings or other information regarding one or more items, as well as selectable features which permit customers to add the items to a virtual "shopping cart" for further evaluation or purchase, or to purchase the items outright.

A customer who visits an online marketplace may execute any number or series of actions when navigating through the online marketplace in order to search for, identify and purchase an item. The customer may execute any number of keyword searches or browse any number of categories until he or she ultimately identifies an item of his or her interest. The customer may perform such steps in any order, such as by executing one or more keyword searches before browsing in one or more categories, or vice versa, and in any combination. Furthermore, a customer may also review one or more customer ratings or reviews of an item, or browse one or more regions of a web page having details regarding the item, before deciding whether or not to purchase the item. Moreover, a customer may use any of a number of computing platforms and/or software applications to interact with the online marketplace, from any location, and may access the online marketplace at any time of day, or for any duration.

Currently, online marketplaces typically provide recommendations of items to customers based on information that may be known regarding the customers, their preferences and/or their purchasing histories. For example, after a customer has purchased an original item, an online marketplace may subsequently recommend another item to the customer that is similar to the original item, e.g., an item that is in the same category as the original item, or that may be used in association with the original item. Alternatively, the online marketplace may recommend another item to the customer that was purchased by others who also purchased the original item. Thus, recommendations of items are commonly provided to customers based on comparisons purchasing histories or attributes of products.

DETAILED DESCRIPTION

Figure 1:
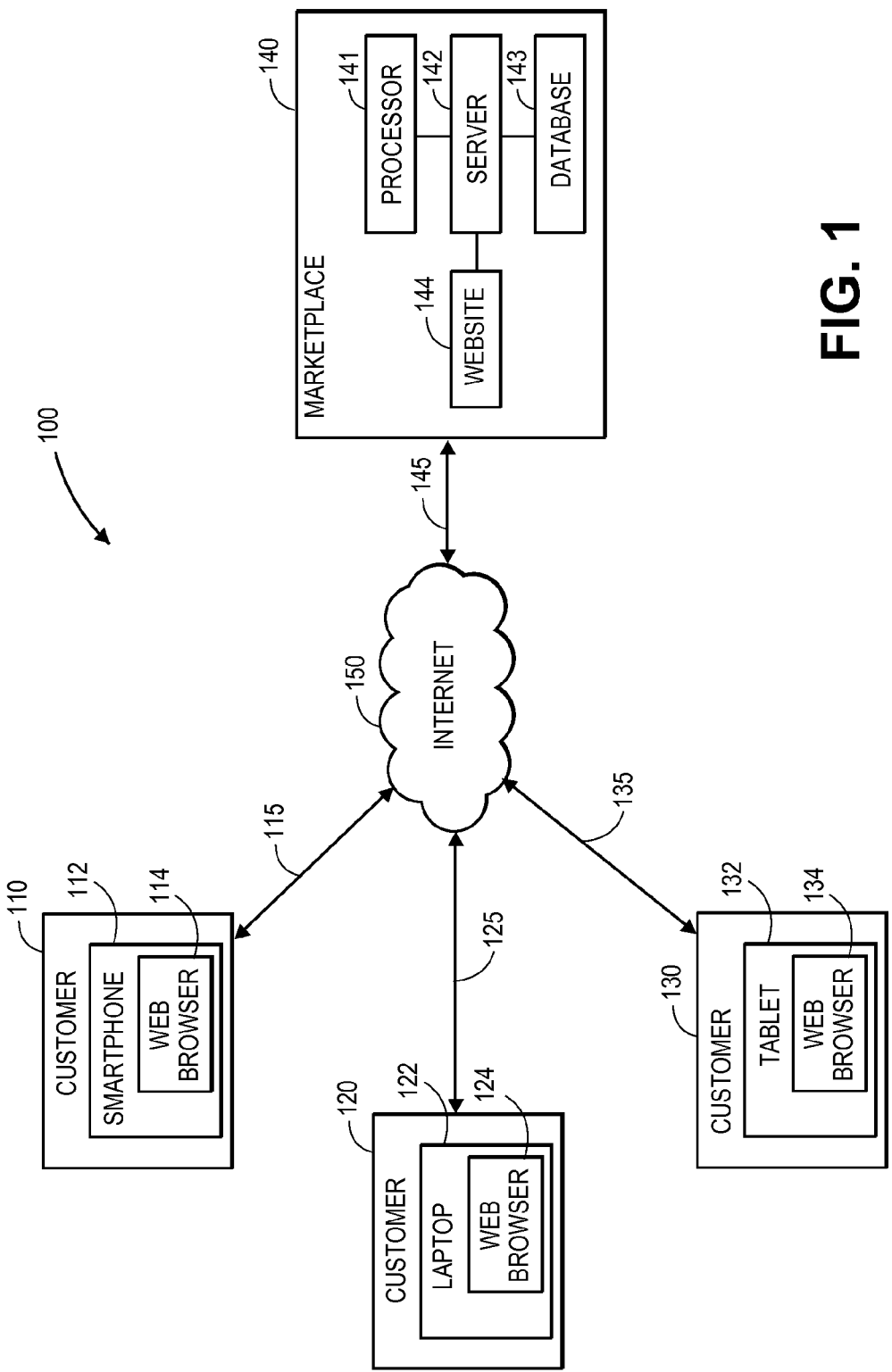
FIG. 1 is a block diagram of a networked system for identifying item recommendations through recognized navigational patterns, in accordance with embodiments of the present disclosure.

As is set forth in greater detail below, the present disclosure is directed to systems and methods for identifying recommendations of items (e.g., goods, products, services, information or media of any type or form) at an online marketplace through the recognition and analysis of one or more navigational patterns that may be defined based on interactions observed from users (e.g., customers, members, consumers, shoppers or buyers) of one or more interactive pages associated with the online marketplace. Some embodiments of the systems and methods disclosed herein may receive or identify information regarding interactions with the online marketplace that are executed by a customer, including but not limited to selections of specific features, regions, portions or aspects of one or more web pages, and define a navigational pattern based on such interactions. The defined navigational pattern may then be compared to historical data regarding navigational patterns that were defined based on the interactions of other customers prior to purchasing an item from the online marketplace, and identify one or more recommendations of items for the customer based on such a comparison.

According to one or more embodiments of the present disclosure, historical data regarding navigational patterns may be analyzed or processed according to one or more statistical methods or means, such as a classifier, in order to determine whether one or more specific interactions observed in a navigational pattern is particularly instructive or dispositive as to whether an item recommendation may be identified. For example, such historical data may be utilized to train the classifier by sorting the historical data into one or more sets, and monitoring the performance of the classifier with regard to one or more of the sets. Once the performance of the classifier is deemed to be adequate for identifying whether or which specific interactions are associated with one or more items, or are not associated with one or more items (e.g., by optimizing the performance of the classifier according to one or more loss functions or objective functions), the trained classifier may receive subsequently defined navigational patterns of customers as inputs, interpret such patterns, and provide outputs, and such outputs may be analyzed in order to identify at least one item recommendation for the customers.

An online marketplace may typically provide customers with a number of features that may be used to search or browse for items of interest. For example, an online marketplace may provide one or more search engines which permit customers to perform keyword-based searches of an online catalog of items, or display an array of selectable links or features, which permit customers to browse for items in one or more categories or groups. An online marketplace may also display advertisements or offers that are directly targeted to one or more specific items or types of items, and may be selected to initiate a review or purchase of such items directly without further activity in the form of searching or browsing. The use of some or all of such features may be restricted to users who register with the online marketplace as members, or open to the public without registration.

Once an item has been identified and selected by a user, an item detail(s) page (or product detail(s) page) may be displayed to the user, including one or more features for reviewing information regarding the item, for adding the item to a virtual "shopping cart," for placing the item on a registry or "wish list," for purchasing the item outright, or taking any other action with regard to the item. The item detail page may include text, images or multimedia regarding the item, rankings or reviews of the item (which may be qualitative or quantitative in nature, and may be provided anonymously or with names of respective reviewers), as well as "chat rooms" or discussion forums, and may be linked or associated with one or more social networks or external sites or platforms. The item detail page may also include advertisements for other recommended items that may complement or act as substitutes for the item, or any other pertinent information. The item detail page may also provide one or more selectable or adjustable features (e.g., radio buttons, drop-down menus or text boxes) that permit a customer to specify any attributes of a desired item (e.g., sizes, colors, models or accessories). Many such features may be presented in numerous locations on a single web page, as well.

Depending on the application and/or the particular item in question, an online marketplace may provide a single, standard details page for an item, or may provide different pages based on the type of computing platform from which the user elected to access the online marketplace. For example, the online marketplace may display one type of item detail page to a user of a mobile phone, or smartphone, and another type of item detail page to a user of a tablet computer, and a third type of item detail page to a user of a laptop or desktop computer.

Finally, where a customer intends to purchase an item, the customer may select one or more appropriate features on an item detail page or other, related page (e.g., a "checkout" page), and execute a transaction for the purchase of the item through one or more predetermined processes. For example, an online marketplace may permit the customer to purchase the item through a standard checkout means, which may require the entry of one or more of a user name or a name of a recipient, a password or Personal Identification Number (or PIN), a shipping address for the item, and an identification of a financial instrument (such as a credit card or debit card) from which a cost of the item is to be deducted. Alternatively, the online marketplace may provide one or more alternate or accelerated checkout means for purchasing the item, in which an order may be executed through a reduced number of interactions, i.e., where some or all of the information required to execute the purchase order is stored or maintained and accessed upon a recognition of a customer, thereby enabling the customer to complete the purchase with a limited number of interactions (e.g., clicks) with a web page.

Therefore, when visiting an online marketplace, a customer may execute any number of interactions with one or more web pages associated with the online marketplace, including web pages that are intrinsic to the online marketplace or web pages that may be hosted externally, such by searching for items through the entry of any number of keywords into a search engine, or browsing for items that have been designated and sorted into any number of categories. A customer may further select and view any number of item detail pages, read or provide any number of customer reviews or ratings of items, view any number of images of items (e.g., zoom or pan such images, or select alternate images or views of the item). Additionally, a customer may traverse through any amount or extent of one or more item detail pages or results lists, including information displayed in a top, bottom, or intermediate portion of such pages.

The various interactions made by customers with the web pages of an online marketplace in a particular session may be aggregated into one or more navigational patterns. At a minimum, a navigational pattern comprises a sequence of pages, or types of pages, that may be accessed by a customer when visiting an online marketplace in accordance with the present disclosure. Accordingly, a navigational pattern may be defined as a vector comprising one or more identifiers of such pages, and an order or sequence in which such pages were accessed. Additionally, a navigational pattern, or a vector representing such a pattern (i.e., a navigational vector), may be augmented to include further information or data regarding the respective interactions, orders or sequences in accordance with the present disclosure. For example, a navigational pattern may define a specific web page (i.e., with regard to a Uniform Resource Locator, or URL, for that web page), or a type of web page (i.e., a gateway or home web page for the online marketplace, as well as an item detail web page, a "shopping cart" web page, a checkout web page or any other web page).

A navigational pattern or vector may further contain information such as a time at which a web page or element was displayed (i.e., a time stamp) by a customer, a duration for which the web page or element remained displayed (i.e., an elapsed time between selections or clicks) to the customer, or an area or portion of a web page that is selected, clicked or viewed by the customer. A navigational pattern may also contain information defining an item or a category of items associated with such interactions, as well. Such information may include a name or title of the item, a category or group with which the item is associated, a keyword entered into a search engine which originated a search for the item, or an icon, set of text or image corresponding to a category selected by the customer.

In any particular session, at least one pattern may be defined based on the interactions of a customer with one or more web pages that may be associated with an online marketplace in a session. For example, a customer who is planning a lakeside vacation may perform a number of keyword searches for items such as "sunscreen," "swim trunks" or "sandals," or may also browse for items in categories such as "boating" or "camping," and purchase one or more of such items accordingly in a single session. A single navigational pattern may be defined based on each of the interactions in a session, or multiple navigational patterns may be defined based on one or more subsets of such interactions (e.g., based on one or more of the actions following the respective keyword or category searches).

Navigational patterns may be identified from substantially large sets of data regarding interactions of customers at online marketplaces. The various customer interactions with web pages associated with an online marketplace may be aggregated into one or more data stores and subjected to data mining analyses, in order to extract or discover relevant information from the interactions, such as various interdependencies between specific interactions or types of interactions. For example, a customer may order an item by viewing a gateway or home page at a first time, entering a keyword into a search engine and viewing search results relating to that keyword at a second time, selecting one such item and viewing an item detail page for that item at a third time, purchasing the item through one or more checkout pages at a fourth time. Another customer may order an item by viewing the gateway or home page at a fifth time, selecting a tab or drop-down menu item corresponding to a category and viewing items in the category at a sixth time, selecting one such item and viewing an item detail page at a seventh time, adding the item to a virtual shopping cart at an eighth time and purchasing the item at one or more checkout pages at a ninth time.

The interactions by each customer with the online marketplace, and those of other customers, may be defined into one or more navigational patterns and analyzed through one or more data mining means or methods in order to identify steps or interactions that may be most likely to lead to a purchase of an item by a customer. In particular, one or more specific details regarding such steps, including the keywords entered or the categories selected, the dates and times of such entries or selections, the interactive content that was displayed to the customer at the times of such entries or selections (e.g., any advertisements or a specific page layout), or the item detail pages viewed by the customer may be processed in order to determine which steps are most critical or dispositive to a customer's decision-making methods.

In one preferred embodiment, historical customer interactions may be analyzed in batch processes, e.g., in offline or back-end processes, in order to define one or more historically observed navigational patterns therefrom. In another preferred embodiment, a set of such interactions may be filtered to identify only groups of interactions that resulted in a purchase of at least one item, and analyzed in order to identify one or more navigational patterns that traditionally result in purchases. For example, each interaction resulting in a purchase of an item, i.e., the ordering of an item from a checkout page, may be identified and the predecessors of such interactions may be analyzed in order to define one or more navigational patterns therefrom.

Once a set of historical navigational patterns which resulted in purchases has been identified, such patterns may be statistically sorted or ranked in order to determine which patterns had the highest degrees or levels of confidence or likelihood of purchase associated therewith, such as by generating a histogram indicative of the frequency of purchases of items with respect to one or more historical navigational patterns, or by determining conditional probabilities of such purchases for each of the historical navigational patterns. Sorting or ranking such patterns may determine which purchases of items were made on a random or anomalous basis, and which purchases of items were made in accordance with consistent, recognizable sequences of specific interactions or types of interactions. Alternatively, sorting or ranking such patterns may further identify those patterns that are rarely or never associated with a purchase of a particular item or category of items, such that recommendations of the particular item or category of items may be avoided when one or more aspects of the patterns are observed in the future.

For example, in many situations, customers may visit an online marketplace with an express purpose of purchasing a flat-screen television and may do so accordingly, such as by entering keywords such as "flat-screen television" a name of a model or brand of television, or by selecting a category of "televisions," reviewing information, ratings or reviews of different models of televisions, and selecting and completing a purchase for one such model of flat-screen television. In other situations, customers may purchase a flat-screen television after browsing information regarding different models of home theater systems, or lists of award-winning movies, and deciding to purchase a new television to accompany a home theater system or for viewing one or more of the movies. In still other situations, customers may visit an online marketplace with no intent of buying a flat-screen television at all, but may purchase one such model after having been inspired to do so upon viewing an advertisement, a review, or an image that includes or describes a flat-screen television. The various interactions of customers which resulted in the purchase of a flat-screen television may be analyzed to identify any particularly relevant navigational patterns executed by such customers are observed. Subsequently, a navigational pattern may be defined based on the interactions of one or more customers, and compared to the previously observed navigational patterns of customers in order to identify any relevant recommendations of items. In such an analysis, the defined navigational pattern may be compared to other navigational patterns which conclusively resulted in the purchases of flat-screen televisions or, alternatively, did not result in any purchases of flat-screen televisions.

A navigational pattern may be defined based on any number or type of customer interactions with web pages, even as few as one interaction, along with any additional relevant data, such as the times or dates associated with each such interaction. For example, a pattern may be defined based on types of pages selected (e.g., a sequence of gateway, search, item detail, review and purchase pages), or specific interactions (e.g., a sequence of a selection of an gateway page, followed by a search for "power tools," a selection of a model of power tool, a selection of a product review of the power tool and a purchase of the power tool). A pattern may also be defined based on a search for a certain item or category of items from a specific platform (e.g., a smartphone or a tablet, laptop or desktop computer) using a specific browser or other application on a particular day or at a particular time.

Where a navigational pattern is sufficiently associated with one or more specific items or types of items, the pattern may serve as a basis for recommending an item to a customer. For example, if a sufficiently high proportion of customers who browse for books in the categories "cooking" and search for items corresponding to the keyword "grill" ultimately purchase some form of charcoal, electric or propane-powered cooking grill, recommendations of apparatuses or accessories relating to grilling (e.g., covers or utensils) may be displayed to customers who subsequently browse for books in the category "cooking" and perform keyword searches for items corresponding to "grill." If a sufficiently high proportion of customers who browse for books in the category "automotive" and search for items corresponding to the keyword "grill" ultimately purchase some form of vent or duct cover for an automobile, then automotive-related accessories (e.g., radiators, speakers) may be displayed to customers who subsequently browse for books in the category "automotive" and perform keyword searches for items corresponding to "grill." The affiliation of a navigational pattern with an item may be determined to any sufficient level or degree of confidence, or defined with respect to any type of threshold, which may relate to a specific item or a category of items, as applicable. Reciprocally, where a navigational pattern is not associated with, or bears no relation to, one or more items or categories of items, the navigational pattern may also serve as a basis for identifying what not to recommend to a customer, i.e., which recommendations of items or categories of items are unlikely to result in a purchase of at least one item.

An association of a navigational pattern with an item or a category or group of items may be determined by any means. In a preferred embodiment, a navigational pattern may be defined based at least in part on a plurality of interactions with the web pages of an online marketplace by a customer that resulted in the purchase of an item, and a multidimensional vector representative of such interactions may be provided to a classifier, which may be trained to recognize associations between navigational patterns, or vectors representative of such patterns, and items in accordance with one or more optimization techniques, including a sum of squared errors or a sum of absolute errors. The classifier may conduct one or more classification analyses of the vector, which may aid in determining one or more of the interactions of the pattern that are particularly valuable or dispositive to the resulting decision by a customer to purchase the original item.

Once the one or more interactions is identified, the observed performance of a sequence including one or more of such interactions with an online marketplace, or a similar sequence, by another customer in the future may trigger a recommendation of an item for that customer. The recommended item may be the original item that was purchased following the original execution of the pattern, or an item related thereto the original item, i.e., an item in the same category as the original item, or an item that is an accessory to the original item. Specifically, the systems and methods disclosed herein may take one or more steps for leading the customer to the recommended item, such as by providing advertisements or recommendations on a web page maintained by the online marketplace, in a "pop-up" window, or in a separate electronic message to the customer, which may be a part of an electronic communications campaign triggered in response to one or more observed sequences or patterns of interactions.

Alternatively, the systems and methods of the present disclosure may determine a likelihood that an item or one of a category of items will be purchased following one or more sequences of interactions, and may market targeted regions or aspects of a web page to merchants who offer such items or categories of items for sale to customers. For example, where it is determined with a sufficiently high level of confidence that customers who select a category "baby," followed by two or more customer reviews of models of cribs, are likely to purchase a crib, the display of targeted advertisements or offers to customers who execute such interactions in the future may be offered to manufacturers of baby cribs, as well as manufacturers of crib sheets, crib pillows, crib mattresses, mobiles and other accessories to baby cribs. Conversely, where it is determined with a sufficiently high level of confidence that a purchase of an item, or one of a category of items, will not be made following one or more sequences of interactions, the display of targeted advertisements or offers to customers who execute such sequences of interactions in the future may be avoided.

After a set of historical customer interactions has been processed in order to identify one or more common navigational patterns that are associated with one or more items, or are not associated with such items, such data may be applied in real time, or in near-real time, the various interactions of one or more customers with the online marketplace may be captured, recorded and/or observed, and aggregated into one or more navigational patterns. When the interactions of a customer are determined to be representative of one or more such patterns, a recommendation of an item that is consistent with such patterns may be provided to the customer. For example, where it is determined that customers who visit an online marketplace, select a category of "hardware," and view an item detail page for at least one adjustable wrench are sufficiently likely to purchase a toolbox, one or more advertisements of toolboxes may be displayed to customers on such item detail pages. Where it is determined that customers who purchase airline tickets for travel to Connecticut subsequently enter the keyword "casino" into a search engine at an online marketplace and read a customer review or rating of at least one book regarding card games are sufficiently likely to visit the Historic Ship Nautilus museum in Groton, Conn., which is located within ten miles of two major casinos, offers for discounted admission to the museum may be provided to such customers upon their entry of the keyword "casino" into the search engine or their viewing of a customer review or rating of a book on the game of blackjack after purchasing airline tickets for travel to Connecticut.

In this regard, a recommendation of an item may be identified for a customer based not on a comparison of the item to other items previously purchased by the customer, or to items previously purchased by other customers, but on comparisons of patterns of interactions observed from the customer to the patterns of interactions of other customers which resulted in the purchase of one or more such items. Such a recommendation may take any form, including a recommendation of a bundle of items, wherein at least one of the items in the bundle corresponds or otherwise relates to a pattern of interactions observed from a customer.

Accordingly, by capturing or observing a sequence of interactions with web pages by a user of an online marketplace, and comparing such a sequence or such interactions to previously observed sequences of interactions with web pages of the online marketplace by other users, one or more item recommendations may be identified and displayed to the user. In particular, where such a sequence or such interactions resulted in the purchase of one or more items, a recommendation of one such item, or of an item related to one or more of the items, may be provided to the customer.

Referring to FIG. 1, the various components of one embodiment of a method and system for identifying item recommendations through recognized navigational patterns in accordance with embodiments of the present disclosure are shown. The system 100 includes a plurality of customers 110, 120, 130 (who may be users, consumers, clients, shoppers or buyers) and an electronic marketplace 140 that may be connected to one another over a communications network 150, such as the Internet.

The customers 110, 120, 130 may be any entities or individuals that wish to purchase one or more items (which may include goods, products, services or information of any type or form) that may be downloaded, purchased, rented, leased, borrowed or otherwise obtained from the marketplace 140. The customers 110, 120, 130 may utilize one or more computing devices, such as a smartphone 112, a laptop computer 122, a tablet computer 132 or any other like machine that may operate or access one or more software applications, such as a web browser 114, 124, 134. The smartphone 112, the laptop computer 122, the tablet computer 132 or the other like machines utilized by the customers 110, 120, 130 may be connected to or otherwise communicate with the marketplace 140 through the communications network 150, such as the Internet, as indicated by lines 115, 125, 135, 145 by sending and receiving digital data over the communications network 150.

The marketplace 140 may be any entity or individual that sells or otherwise makes items available for download, purchase, rent, lease or borrowing by customers, such as the customers 110, 120, 130. Additionally, the marketplace 140 itself may also be a manufacturer or vendor of the items that are to be made available there.

The marketplace 140 may include or operate one or more physical computer machines or devices, having one or more processors 141, servers 142 or databases 143, and may maintain a marketplace web site 144 which may be implemented using one or more of the processors 141, servers 142 or databases 143. Additionally, the marketplace 140 may feature software applications and/or hardware components for analyzing data received from customers, such as the customers 110, 120, 130, including data regarding customers' movements, actions, preferences, purchasing histories or personal information. The marketplace 140, the processors 141, servers 142, databases 143, and web site 144 may be connected to or otherwise communicate with the customers 110, 120, 130 by sending and receiving digital data over the communications network 150, as indicated by lines 115, 125, 135, 145.

The web browsers 114, 124, 134 operating on the smartphone 112, the laptop computer 122 or the tablet computer 132, respectively, may provide one or more features, applications or user interfaces that permit the customers 110, 120, 130 to view and access online content, such as the content provided at one or more web sites, including but not limited to the marketplace web site 144. Also, those of skill in the pertinent art will recognize that the customers 110, 120, 130 may use a keyboard, keypad, mouse, stylus, touch screen, or other device (not shown) or method for interacting with the smartphone 112, the laptop computer 122 or the tablet computer 132 and/or the web browsers 114, 124, 134 operating thereon, or to "select" an item, link, node, hub or any other aspect of the present disclosure.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the terms "user," "customer," "consumer," or like terms, may refer to any entity or individual that wishes to download, purchase, rent, lease, borrow, or otherwise obtain items or media from a marketplace and/or a media service, as well as the associated computer systems operated or controlled by a user, a customer or a consumer, respectively. Except where otherwise explicitly or implicitly indicated herein, the term "marketplace," or like terms, may refer to any entity or individual that sells or otherwise makes items available for download, purchase, rent, lease or borrowing using one or more computer systems, as well as the associated computer systems operated or controlled by such an entity or individual.

Thus, process steps described as being performed by a "user," a "customer," a "consumer" or a "marketplace" may be automated steps performed by their respective computer systems or devices, or implemented within software modules (or computer programs) executed by one or more computer systems or devices. Specially designed hardware could, alternatively, be used to perform certain operations.

For example, the customers 110, 120, 130 may use any software, web-enabled or Internet applications operating on a computing device 112, 122, 132 such as the web browser 114, 124, 134 or any other client-server applications (e.g., dedicated shopping applications) or features including electronic mail (or E-mail), short or multimedia messaging service (SMS or MMS) text messages, social networking messages or postings, or other messaging techniques to communicate with (or connect to) the marketplace 140, the processors 141, the servers 142, the databases 143 and/or the web site 144, through the communications network 150. In addition, the computing devices utilized by customers in accordance with the present disclosure may be any of a number of computer-related machines that are capable of communicating over the communications network 150, including but not limited to set-top boxes, personal digital assistants, mobile telephones, digital media players, web pads, desktop computers, laptop computers, tablet computers, smart phones, televisions, automobile entertainment systems, appliances, electronic book readers, and the like. The protocols and components for providing communication between the smartphone 112 and/or the web browser 114, the laptop computer 122 and/or the web browser 124, the tablet computer 132 and/or the web browser 134, and/or the marketplace 140, the processor 141, the server 142, the database 143 and/or the web site 144 are well known to those skilled in the art of computer communications and thus, need not be described in more detail herein.

Except where otherwise explicitly or implicitly indicated herein, the term "keyword" or "category" may include or refer to individual words or groupings of alphanumeric characters, as well as strings of multiple words or groupings of alphanumeric characters that may be separated by spaces, commas, dashes, colons, semicolons, or any other delimiter. Keywords and/or categories may be used to initiate searches, such as by entering a keyword into a search engine or text box displayed by a web browser 114, 124, 134, or by selecting a category from a list, such as an online catalog. For example, the entry or selection of the keyword or category "dining" may return a different set of results than the entry or selection of the keyword or category "dining room" or "fine dining." Additionally, the term "keyword" or "category" can refer to a particular category (such as "home and garden" or "music"), brand (such as "Nike"), or theme (such as "summertime"), either specifically or generally, as well as one or more particular items (such as "Stephen King novels").

The data and/or computer executable instructions, programs, firmware, software and the like (also referred to herein as "computer executable" components) described herein may be stored on a computer-readable medium that is within or accessible by the smartphone 112, the laptop computer 122, the tablet computer 132 and/or the marketplace processors 141, servers 142, databases 143 or web site 144, and having sequences of instructions which, when executed by a processor (such as a central processing unit, or CPU), cause the processor to perform all or a portion of the functions and/or methods described herein. Such computer executable instructions, programs, software and the like may be loaded into the memory of the smartphone 112, the laptop computer 122, the tablet computer 132 and/or the marketplace processors 141, servers 142, databases 143 or web site 144 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of identifying recommendations of items to be purchased from an online marketplace, such as the marketplace 140 shown in FIG. 1, based on patterns of interactions observed from customers who are navigating through one or more web pages maintained or provided by or on behalf of the online marketplace. As will be recognized by those of skill in the art, however, the systems and methods disclosed herein may also be used in many other situations, and with regard to any other sources of information, and are not limited to any of the embodiments described herein.

As is set forth above, the systems and methods of the present disclosure may identify one or more recommendations of items through the observed, historical interactions of users of an online marketplace, which may be aggregated into navigational patterns and associated with one or more items, such as an item purchased following such patterns. Subsequently, where a customer executes one or more interactions with the online marketplace, such interactions may be aggregated into a navigational pattern, which may be compared to navigational patterns that were previously observed at the online marketplace, and one or more recommendations of items may be identified thereby.

Figure 2:
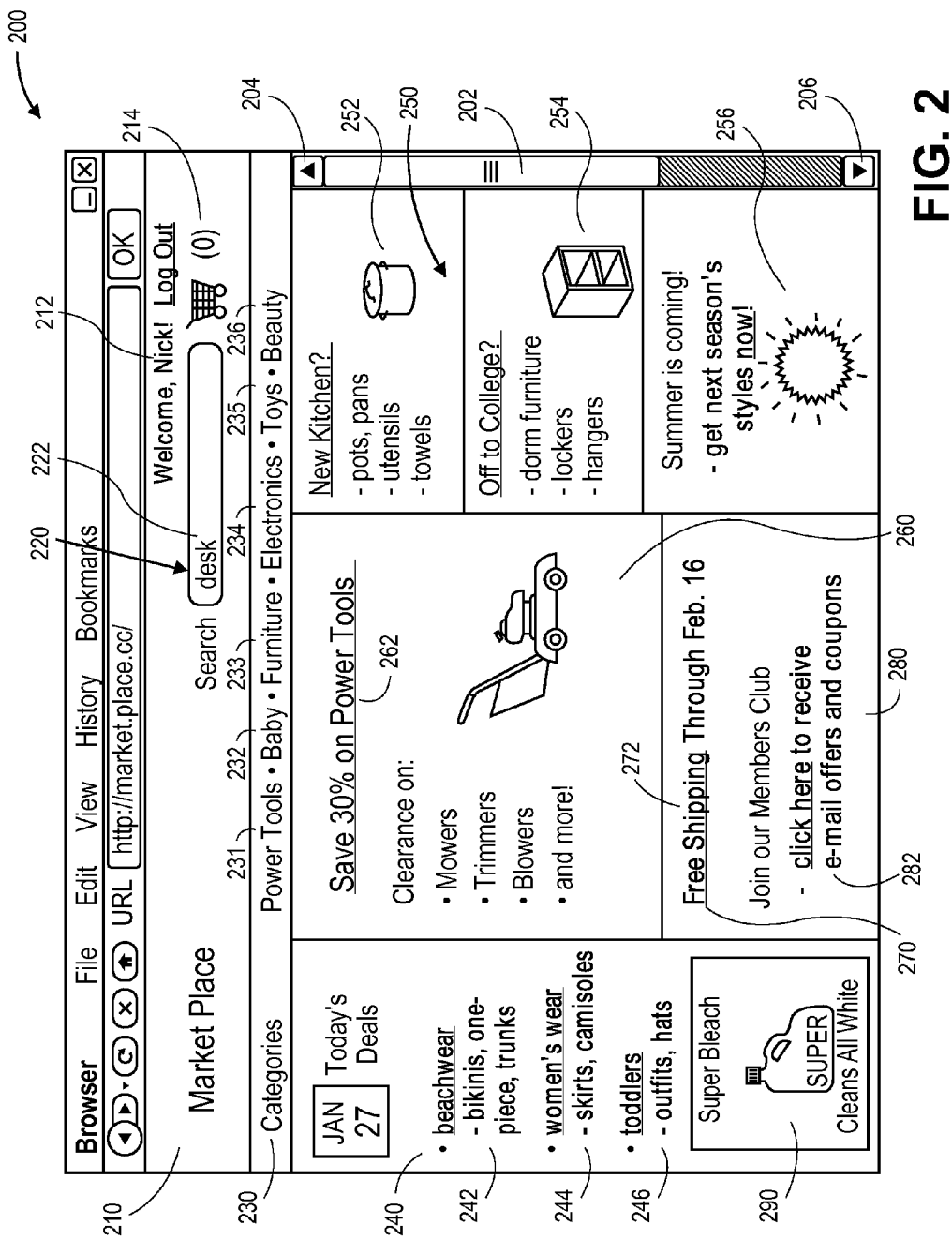
FIGS. 2-6 depict user interfaces to be analyzed by systems and methods for identifying item recommendations through recognized navigational patterns, in accordance with embodiments of the present disclosure.

Web pages that are associated with an online marketplace may permit a user to execute a number of interactions therewith. Referring to FIG. 2, a web browser 200 displaying a gateway web page 210 is shown. The web browser 200 includes a scroll bar 202 and arrows 204, 206 which enable a customer to translate the web page 210 within the web browser 200, and display one or more specific portions thereof. The web page 210 also displays a name 212 of the customer, and includes an icon 214 indicative of a number of items that have been placed into a virtual shopping cart of the customer.

As is shown in FIG. 2, the web page 210 includes a number of features that may be accessed, selected or otherwise activated by the customer, including a search box 220 and a category bar 230 having selectable categories 231, 232, 233, 234, 235, 236 therein. In order to identify one or more desirable items, a customer may enter a search term 222 (i.e., "desk") into the search box 220, which will initiate a search of an online catalog for one or more items pertaining to the search term 222. Similarly, the customer may select one of the categories 231, 232, 233, 234, 235, 236 in the category bar 230, which will result in a display of one or more items related to the selected category. The web page 210 further includes information or advertisements displayed in a number of frames 230, 240, 250, 260, 270, 280, 290. The frame 240 includes a number of time-dependent offers 242, 244, 246, and the frame 250 includes a number of themed offers 252, 254, 256, each of which may be selected by the customer in order to receive information regarding items pertaining to such offers. The frame 260 includes a clearance offer 262, while the frame 270 includes a shipping offer 272, and the frame 280 includes a membership offer 282. The frame 290 includes an advertisement 292 for a specific product.

Thus, as is discussed above, a customer who visits a home page associated with an online marketplace, such as the gateway 210 shown in FIG. 2, may select or otherwise interact with any number of features that may be displayed thereon, including the search box 220 or category bar 230, the offers 242-246, 252-256, 262, 272, 282 or the advertisement 292.

Figure 3:
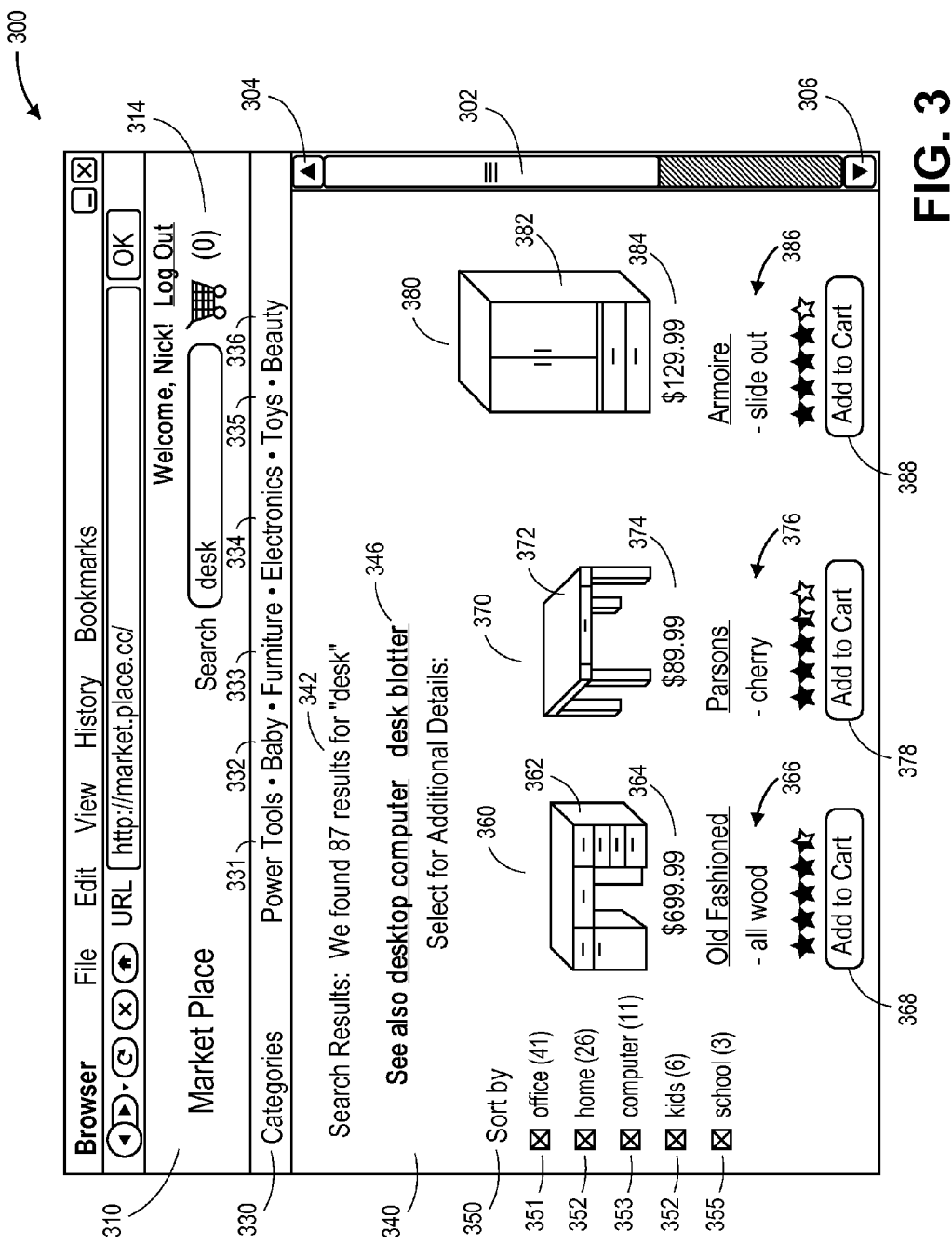

Following one or more such interactions with a web page at an online marketplace, such as the gateway 210 shown in FIG. 2, one or more other web pages may be displayed. For example, a search results page may be displayed if the customer enters a search term 222 into the search box 220, and a category results page may be displayed if the customer selects one or more of the categories 231-236 in the category bar 230. Referring to FIG. 3, a web browser 300 displaying a search results page 310 is shown. Except where otherwise noted, reference numerals preceded by the number "3" in FIG. 3 indicate components or features that are similar to components or features having reference numerals preceded by the number "2" shown in FIG. 2.

As is shown in FIG. 3, the web page 310 includes a variety of interactive features and information regarding a series of items that is displayed in response to the entry of the search term 222 into the search box 220 of FIG. 2. The web page 310 includes information 340 regarding the search, such as a number 342 of responsive search results, as well as alternate terms 344, 346 which are similar to the search term 222, and may be selected in order to initiate subsequent searches for items that are related to such alternate terms 344, 346. The web page 310 also includes a plurality 350 of selectable check boxes 351, 352, 353, 354, 355, which may be selected or deselected, as necessary, in order to filter some or all of the results from the web page 310. Furthermore, information regarding three items 360, 370, 380 that are responsive to the search term 222 is also shown. For each of the items 360, 370, 380, an image 362, 372, 382, a price 364, 374, 384 and details 366, 376, 386 (including a selectable name of the item, characteristics of the item and product ratings for the item) are shown. Likewise, selectable buttons 368, 378, 388 for adding each of the items 360, 370, 380 to a shopping cart for eventual purchase are also shown.

Additionally, the web page 310 also includes the search box 320, which permits a customer to initiate a subsequent search for items pertaining to a search term 322, and the category bar 330, which permits the customer to select one or more additional categories for subsequent browsing and evaluation of items in such categories. Thus, a customer of an online marketplace who is visiting a search results page, such as the search results page 310 of FIG. 3, may select or otherwise interact with any number of features that may be displayed thereon, such as the search box 320 or category bar 330, the alternate search terms 344, 346, the check boxes 351-355, the items 360, 370, 380 or the buttons 368, 378, 388.

Figure 4:
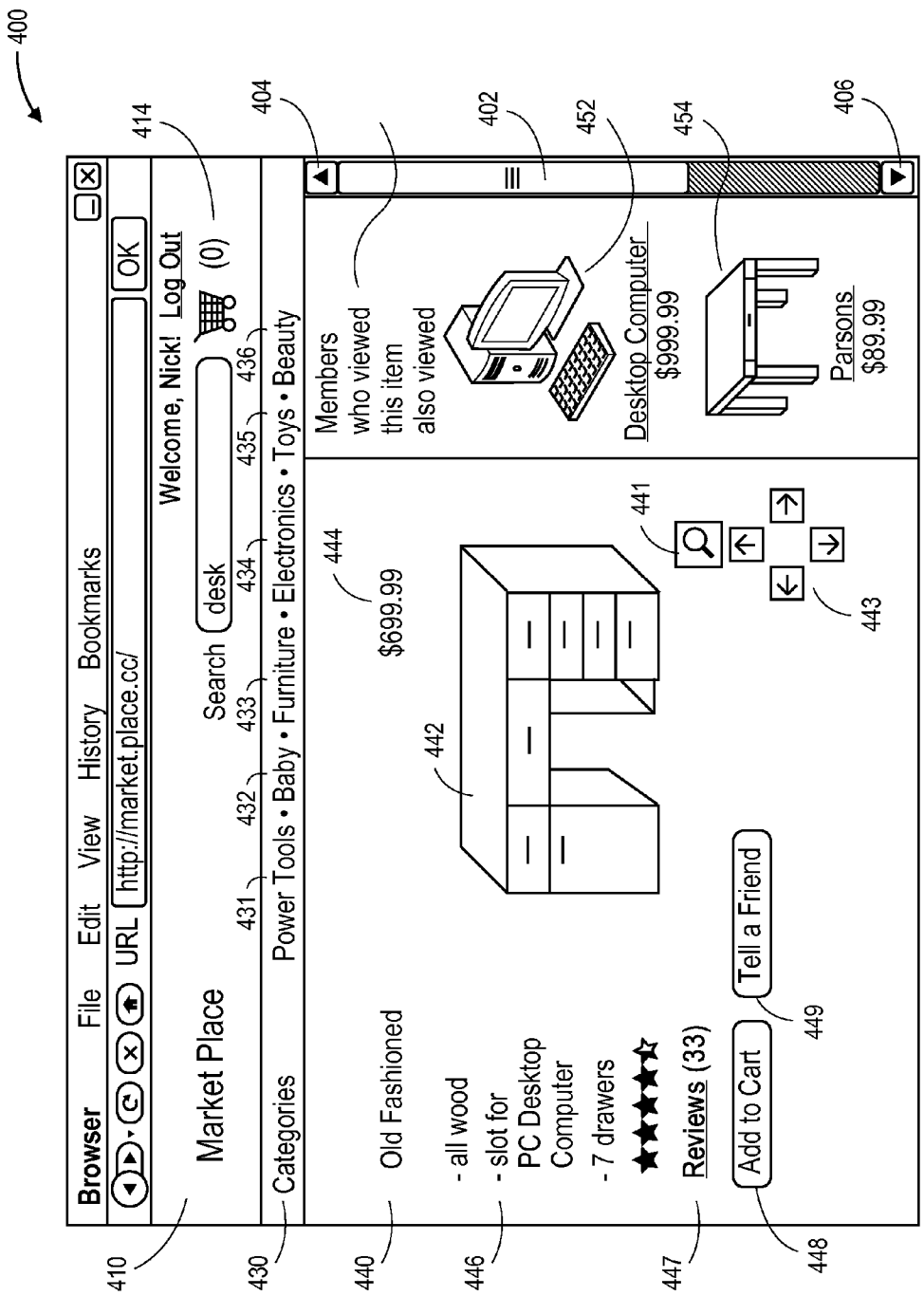

After viewing a search results page, such as the search results page 310 shown in FIG. 3, a customer may select one of the items displayed thereon, and an item detail page may be displayed in response to the selection. Referring to FIG. 4, a web browser 400 displaying an item detail page 410 is shown. Except where otherwise noted, reference numerals preceded by the number "4" in FIG. 4 indicate components or features that are similar to components or features having reference numerals preceded by the number "3" shown in FIG. 3, or reference numerals preceded by the number "2" shown in FIG. 2.

As is shown in FIG. 4, the search results page 410 includes information regarding a selected item 440, including an image 442 of the item, a price of the item 444, details 446 regarding the item, a link 447 for reviewing customer reviews of the item, and buttons 448, 449 for adding the item to a shopping cart or forwarding information regarding the item 440 to another person. The search results page 410 also includes buttons 441, 443 for zooming or panning the image 442. The search results page further includes selectable item recommendations 452, 454 that may be believed to be of interest to the customer.

Additionally, the web page 410 also includes the search box 420, which permits a customer to initiate a subsequent search for items pertaining to a search term 422, and the category bar 430, which permits the customer to select one or more additional categories for subsequent browsing and evaluation of items in such categories. Thus, a customer of an online marketplace who is visiting a search results page, such as the search results page 410 of FIG. 4, may select or otherwise interact with any number of features that may be displayed thereon, such as the search box 420 or category bar 430, the link 447, the buttons 441, 443, 448, 449 or the item recommendations 452, 454.

Figure 5:
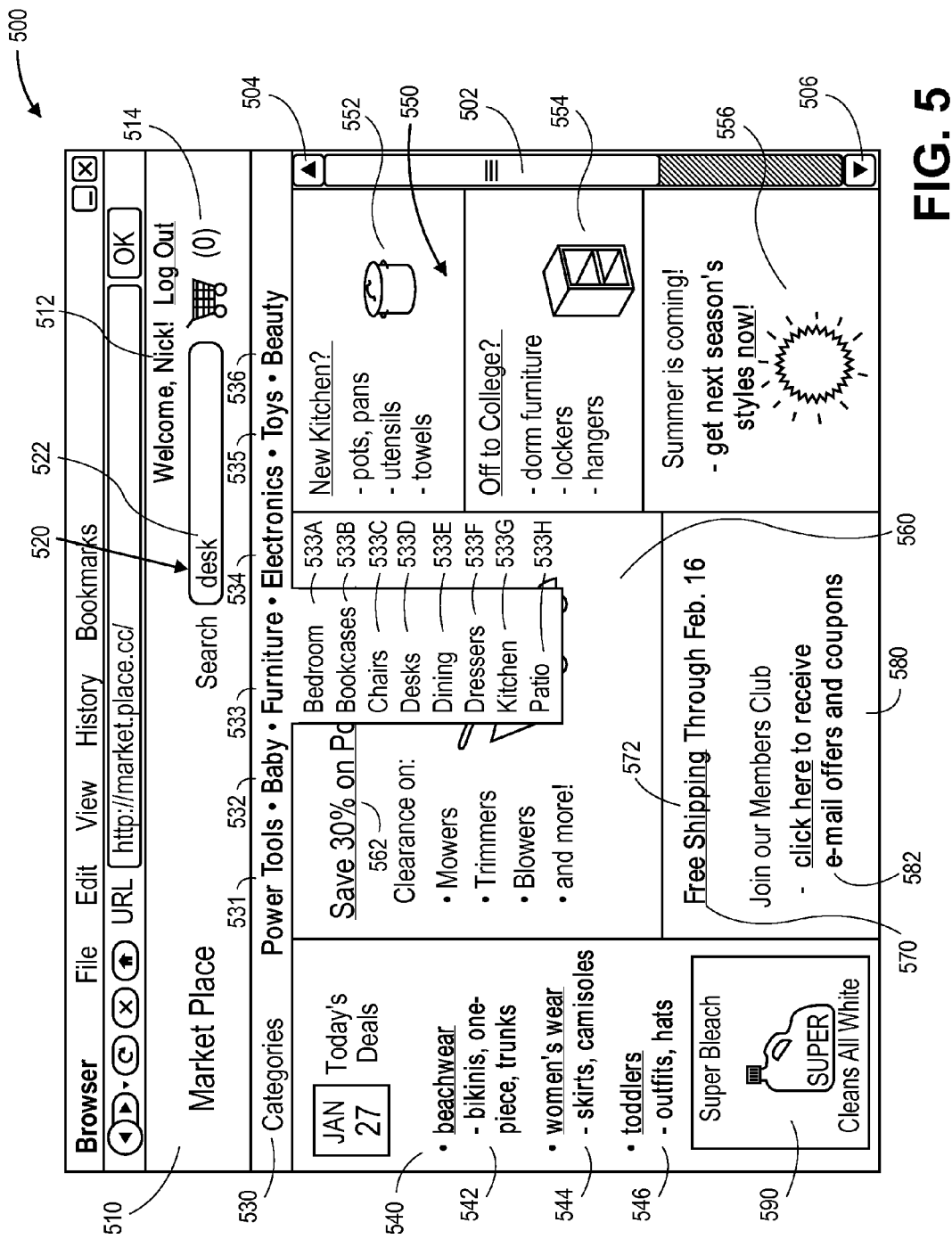

As is discussed above, a customer may also browse for items at an online marketplace by selecting one or more categories from a web page of the online marketplace. Referring to FIG. 5, a web browser 500 displaying a gateway web page 510 is shown. Except where otherwise noted, reference numerals preceded by the number "5" in FIG. 5 indicate components or features that are similar to components or features having reference numerals preceded by the number "2" shown in FIG. 2.

As is shown in FIG. 5, upon the selection of a category 533, a drop-down menu having a plurality of subcategories 533A, 533B, 533C, 533D, 533E, 533F, 533G, 533H may be displayed. The drop-down menu may appear over one or more of the other portions of the web page 510, and any of the subcategories 533A, 533B, 533C, 533D, 533E, 533F, 533G, 533H shown therein may be selected by the customer in order to receive information regarding items in the selected category 533 and a selected subcategory.

Figure 6:
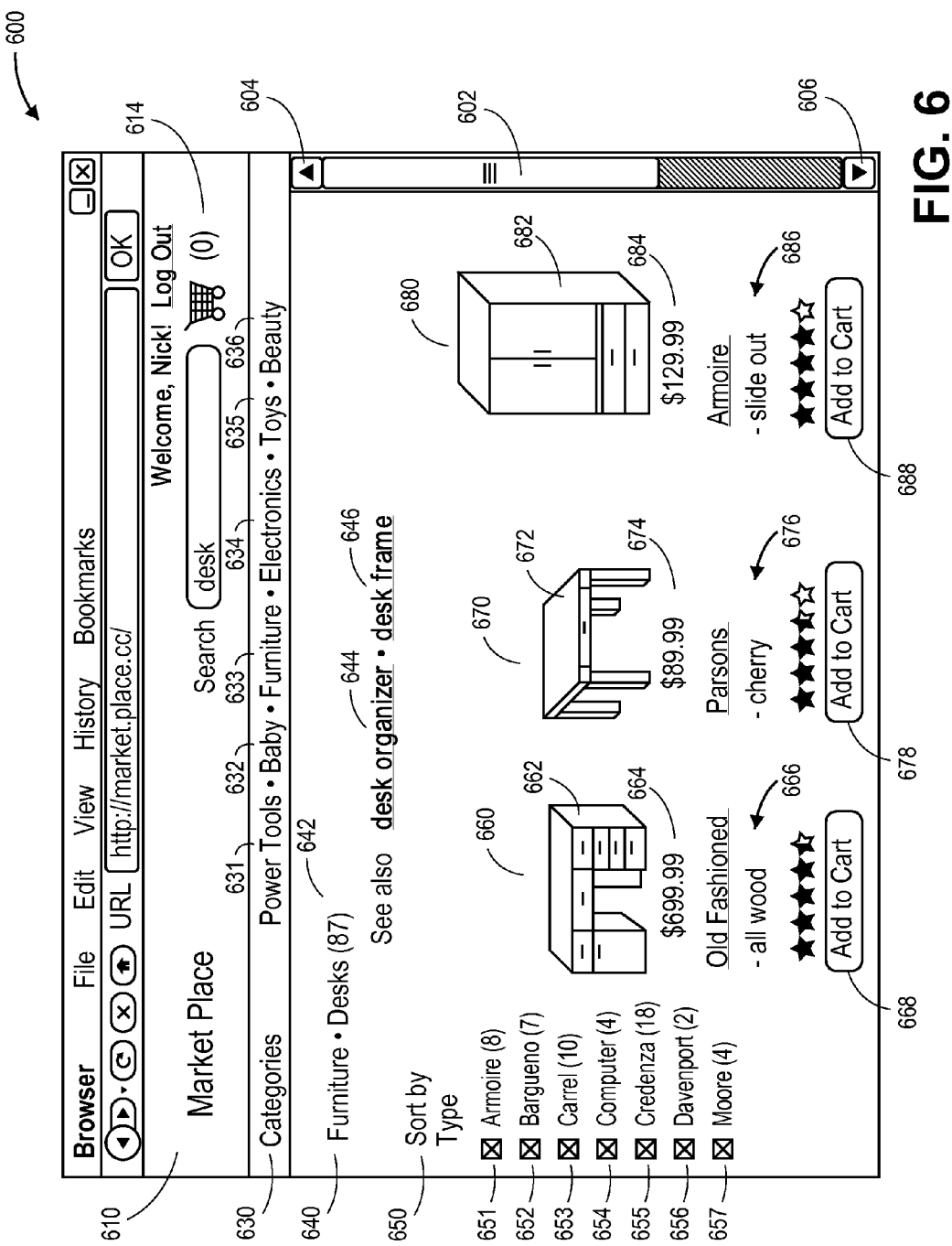

Referring to FIG. 6, a web browser 600 displaying a category results page 600 is shown. Except where otherwise noted, reference numerals preceded by the number "6" in FIG. 6 indicate components or features that are similar to components or features having reference numerals preceded by the number "3" shown in FIG. 3.

The category results page 610 includes a variety of interactive features and information regarding a series of items that is displayed in response to the selection of category 533 and the selection of subcategory 533D (i.e., "desks") shown in FIG. 5. The web page 610 includes information 640 regarding the selected category 533 and subcategory 533D, such as a number 642 of responsive results, as well as alternate terms 644, 646 which are similar to the selected category 533 and subcategory 533D, and may be selected in order to initiate subsequent requests for items that are related to such alternate terms 644, 646. The web page 610 also includes a plurality 650 of selectable check boxes 651, 652, 653, 654, 655, 656, 657 which may be selected or deselected, as necessary, in order to filter some or all of the results from the web page 610. Furthermore, information regarding three items 660, 670, 680 that are responsive to the selected category 533 and subcategory 533D are also shown. For each of the items 660, 670, 680, an image 662, 672, 682, a price 664, 674, 684 and details 666, 676, 686 (including a selectable name of the item, characteristics of the item and product ratings for the item) are shown. Likewise, selectable buttons 668, 678, 688 for adding each of the items 660, 670, 680 to a shopping cart for eventual purchase are also shown.

Additionally, the web page 610 also includes the search box 620, which permits a customer to initiate a subsequent search for items pertaining to a search term 622, and the category bar 630, which permits the customer to select one or more additional categories for subsequent browsing and evaluation of items in such categories. Thus, a customer of an online marketplace who is visiting a search results page, such as the search results page 610 of FIG. 6, may select or otherwise interact with any number of features that may be displayed thereon, such as the search box 620 or category bar 630, the alternate search terms 644, 646, the check boxes 651-655 the items 660, 670, 680 or the buttons 668, 678, 688.

Therefore, as is discussed above with regard to the web pages 210, 310, 410, 510, 610 of FIGS. 2-6, customers who visit an online marketplace may execute a number of interactions with such pages, including but not limited to the specific interactions listed on each particular page. Additionally, customers may also translate the web pages 210, 310, 410, 510, 610 within the browsers 200, 300, 400, 500, 600 using the sliders 202, 302, 402, 502, 602 or by selecting buttons 204, 206, 304, 306, 404, 406, 504, 506, 604, 606. The systems and methods of the present disclosure may capture, record and/or observe such interactions, and utilize such interactions in defining one or more navigational patterns.

As is discussed above, the systems and methods of the present disclosure are directed to identifying commonalities between navigational patterns of historically observed user interactions with one or more web pages, such as those pages that are displayed at an online marketplace, and navigational patterns of presently observed user interactions with such pages. Where a pattern of historically observed user interactions corresponds to an item, or a category of items, a recommendation of such an item, or of a related item (i.e., an item in the same category as the item), may be identified and provided to the customer. A pattern of interactions may take any form and be of any length, and may be compared to one or more historically observed patterns on any basis in order to identify any commonalities that may be apparent between the presently and historically observed patterns.

Figure 7:
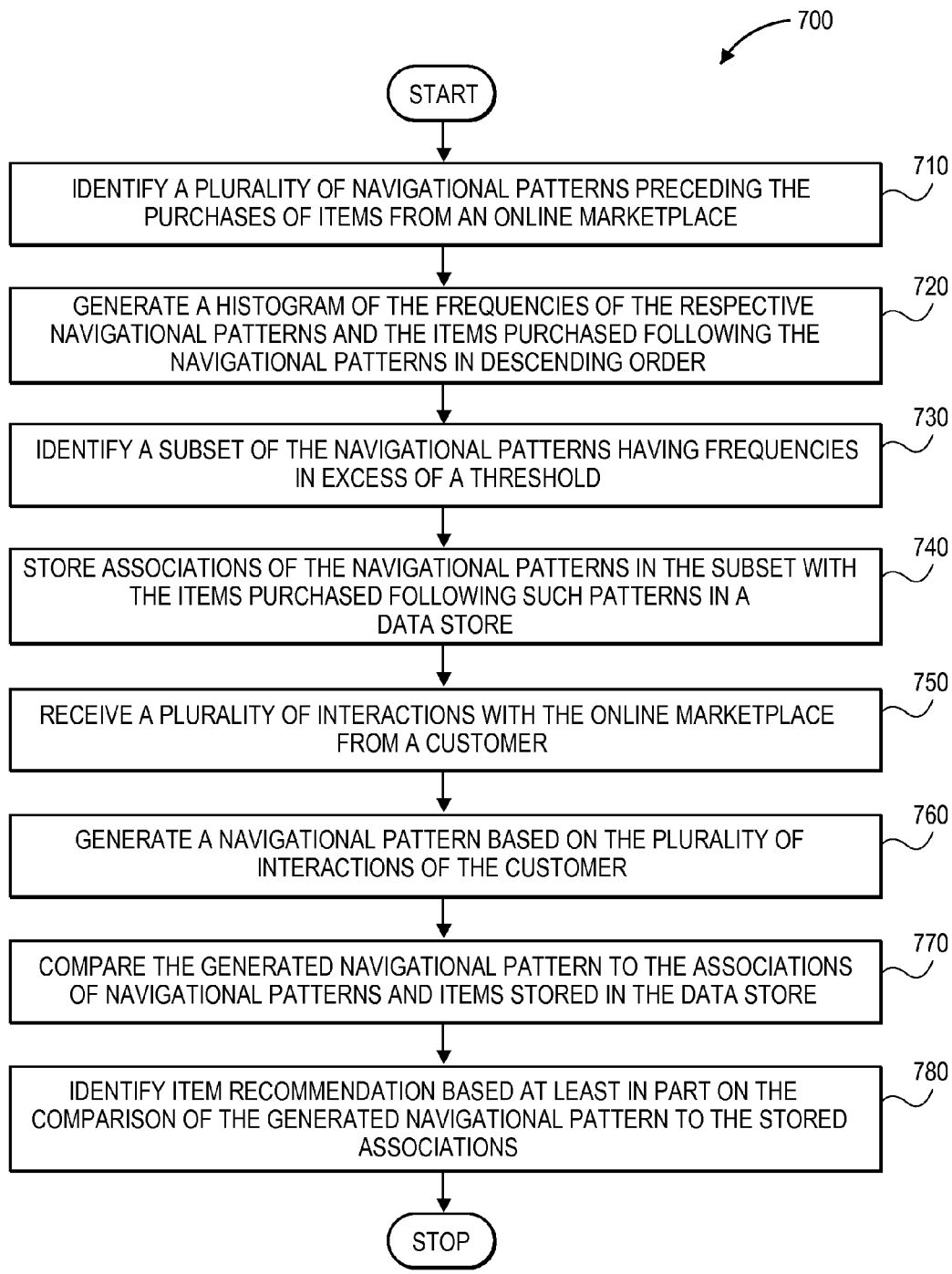
FIG. 7 is a flow chart of one process for identifying item recommendations through recognized navigational patterns, in accordance with embodiments of the present disclosure.

Referring to FIG. 7, a flow chart 700 of one process for identifying item recommendations through recognized navigational patterns in accordance with embodiments of the present disclosure is shown. At step 710, a plurality of navigational patterns that preceded the purchase of items from an online marketplace is identified. Such patterns may be stored in one or more data stores in association with the each of the respectively purchased items, and may have been defined based on any number of interactions or steps taken by customers, including but not limited to the entry of any keywords into a search box 220 or the selection of one or more of the categories 231-236 displayed on the web page 200 of FIG. 2, or any other interactions.

At step 720, a histogram of the frequencies of the respective navigational patterns and the items purchased following each of the navigational patterns in descending order is generated. For example, each of the navigational patterns may be uniquely identified and sorted or ranked based on the number of instances in which a specific item was purchased following such navigational patterns. The interactions of each of the navigational patterns may be referenced with any degree of specificity (i.e., an interaction may refer to the performance of a search from a gateway page, or the performance of a search of a specific item), and each of the navigational patterns may be likewise associated with one or more items on a general or specific basis (i.e., where a navigational pattern results in a purchase of an item, the pattern may be associated with a mere purchase of an item, a purchase of the specific item, or a purchase of an item in the category of the specific item).

At step 730, a subset of the navigational patterns having frequencies in excess of a threshold is identified. For example, a group of the navigational patterns that results in the purchase of any item, of a particular item, or of an item in a specific category at least eighty-five percent (85%) of the time, or any other share or expression of a confidence level, may be identified. At step 740, associations between the navigational patterns of the subset and the items purchased following such navigational patterns are stored in a data store.

At step 750, a plurality of interactions with the online marketplace is received from a customer. As is discussed above, such interactions may be referenced with respect to types of web pages (e.g., a gateway home page, a search results page, a category results page, an item detail page or product detail page, a checkout page or a shopping cart page), specific web pages (e.g., search results pages following a specific keyword search), or with portions or specific locations thereof. At step 760, a navigational pattern is generated based on the plurality of interactions received from the customer. As is also discussed above, such a pattern may be defined based on a sequence of interactions, and may be augmented to include further information or data regarding the respective interactions, such as an item, a keyword or a category associated with such interactions, times at which the interactions were performed or received, or computing platforms or browsers from which such interactions were executed.

At step 770, the navigational pattern is compared to the associations between the navigational patterns and the items stored in the data store. For example, the interactions and/or the sequence of interactions of the navigational pattern generated at step 760 may be compared to historically observed navigational patterns which resulted in the purchase of items in accordance with one or more optimization techniques, in order to identify any commonalities therewith. Such techniques may utilize a classifier or other statistical or mathematical tool that has been trained to recognize associations between navigational patterns and items to within acceptable levels of errors or tolerances. At step 780, an item recommendation is identified based at least in part on the comparison of the navigational pattern to the stored associations of patterns and items. For example, where the navigational pattern defined at step 760 is sufficiently similar to one of the historically observed navigational patterns associated with the purchase of an item, a recommendation of the associated item, or of an item that is related to the associated item, may be provided to the customer (i.e., in one or more web pages associated with the online marketplace, or in another electronic communication), and the process ends.

Accordingly, by capturing user interactions of a customer with one or more web pages of an online marketplace, defining a navigational pattern based on such interactions and comparing the navigational pattern to historically observed navigational patterns that are each associated with an item, a recommendation of an item may be provided to the customer that is consistent with such interactions. The patterns may be defined based on any number, type or kind of interaction with a web page, and with any level of specificity, and may further be augmented with any relevant information regarding the interaction. Moreover, although the process shown in the flow chart 700 of FIG. 7 operates by identifying patterns having statistically high frequencies with respect to a threshold, those of ordinary skill in the pertinent arts would recognize that the systems and methods of the present disclosure are not so limited, and that patterns having statistically low frequencies with respect to a threshold may also be considered when identifying one or more item recommendations for a customer. For example, where a pattern defined based on a customer's interactions is statistically unlikely to result in a purchase of one specific item, or of items in a particular category, recommendations of the specific item, or of the items in the particular category, may be avoided.

Figure 8:
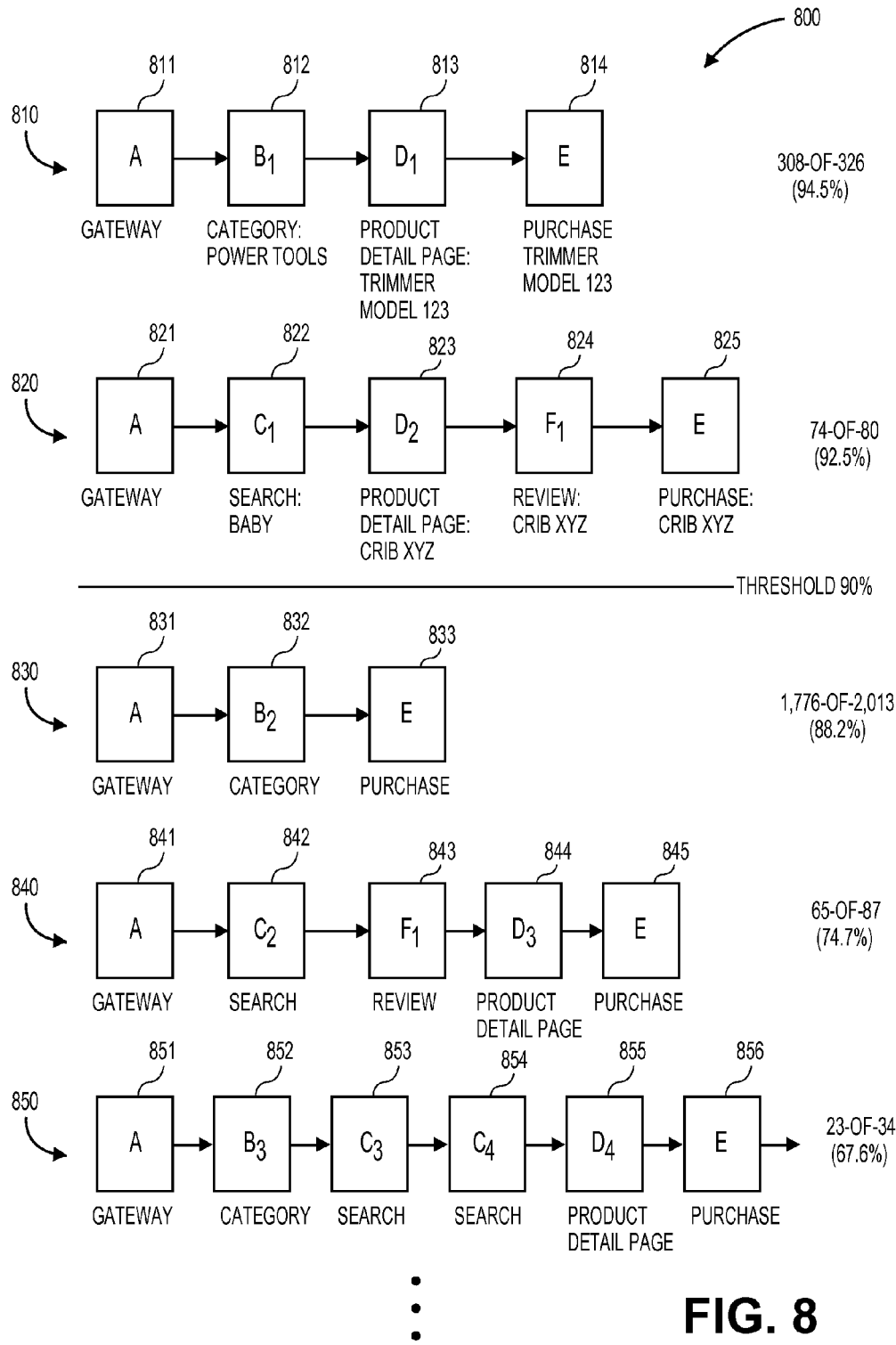
FIG. 8 depicts an array of navigational patterns that may be recognized and analyzed by systems and methods for identifying item recommendations through recognized navigational patterns, in accordance with embodiments of the present disclosure.

Referring to FIG. 8, a series 800 of navigational patterns 810, 820, 830, 840, 850 defined based on customer interactions with web pages of an online marketplace is shown. The navigational patterns 810, 820, 830, 840, 850 are defined with regard to a type of web page and/or event (i.e., gateway, search or purchase) as expressed with a letter (i.e., A, B, C), and also with an ordinal reference to a specific web page of the type (i.e., a search for a specific keyword or item) as expressed with a number (i.e., 1, 2, 3) where applicable. The navigational patterns 810, 820, 830, 840, 850 are also shown with their respective associations with items in a frequentist probability against a threshold (viz., ninety percent, or 90%).

Pattern 810 comprises a viewing 811 of a gateway page, a selection 812 of a category (i.e., "power tools") and a viewing 813 of an item detail page for a specific item (i.e., a model of a trimmer), resulting in a purchase 814 of the specific item. As is shown in FIG. 8, the viewing 811 of the gateway page, the selection 812 of the category and the viewing 813 of an item detail page for the specific item resulted in a purchase 814 of the item in 308 of 326 instances, or in 94.5% of such instances. Pattern 820 comprises a viewing 821 of a gateway page, a search 822 for a specific keyword (i.e., "baby"), a viewing 823 of an item detail page for a specific item and a viewing 824 of a review of the specific item, resulting in a purchase 825 of the specific item. As is also shown in FIG. 8, the viewing 821, the search 822, the viewing 823 and the viewing 824 resulted in a purchase 825 of the item in 74 of 80 instances, or in 92.5% of such instances.

Thus, the pattern 810 defined as including the viewing 811, the selection 812 and the viewing 813, and the pattern 820 defined as including the viewing 821, the search 822, the viewing 823 and the viewing 824 each resulted in the purchases 814, 825 of items in frequencies that exceeded the ninety percent (90%) threshold. Therefore, each such pattern 810, 820 may be considered when identifying item recommendations in accordance with the systems and methods of the present disclosure. Once a customer is observed as performing one or all of the interactions 811, 812, 813 of the pattern 810, or the interactions 821, 822, 823, 824 of the pattern 820, recommendations of the items 814, 825 purchased, or items that are similar to the items 814, 825 purchased, may be provided to the customer.

Referring again to FIG. 8, the patterns 830, 840, 850 did not result in the purchases of items in frequencies in excess of the threshold. Pattern 830 comprises a viewing 831 of a gateway page and a selection 832 of a category, which resulted in a purchase 833 of an item in 1,776 of 2,013 instances, or in 88.2% of such instances. Pattern 840 comprises a viewing 841 of a gateway page, a search 842 for a specific keyword, a viewing 843 of a product review and a viewing 844 of an item detail page, which resulted in a purchase 845 of an item in 65 of 87 instances, or in 74.7% of such instances. Pattern 850 comprises a viewing 851 of a gateway page, a selection 852 of a category, a search 853 for a specific keyword, a search 854 for another keyword and a viewing 855 of an item detail page resulted in a purchase in 23 of 34 instances, or in 67.6% of such instances.

Therefore, as is discussed above, a navigational pattern may be defined based at least in part on one or more user interactions with web pages of an online marketplace, and may be further augmented with additional information regarding the pages, including an order or sequence in which each as is selected, a time at which each page is selected, or any further details regarding each of the respective interactions, such as a keyword on which a search is based, a category that is selected to initiate a search, a type of computing platform (e.g., smartphone, tablet computer, laptop computer) or application (e.g., a web page or a dedicated shopping application) from which the interaction is received, a specific item or quantity of items purchased as a result of the interactions, or any other relevant information. The navigational pattern may be further defined with regard to a region of a web page with which the user interacts, such as by selecting a hyperlink of "home" located along a top margin or a bottom margin of a web page versus reentering a new URL corresponding to a gateway page, or any other aspect of the web page.

Moreover, a threshold for determining whether a navigational pattern may be relied upon in identifying item recommendations based on observed user interactions may also be established with regard to any relevant factor and may vary based on the degree of specificity observed with respect to each such interaction. For example, where a navigational pattern is observed prior to the purchase of an electric-powered paint roller, the interactions comprising the navigational pattern may be considered with regard to a first threshold in view of the broad category "home improvement," a second threshold in view of the narrower category "paint," and a third threshold in view of a keyword "electric-powered paint roller."

As is discussed above, a navigational pattern may be defined using one or more vectors which depict the various user interactions in a multi-dimensional space. In this regard, a navigational pattern vector P comprising n interactions may be represented as is shown in Equation (1) below:

$$P = (\text{interaction}_1, \text{interaction}_2, \ldots \text{interaction}_{n-1}, \text{interaction}_n) \quad (1)$$

where P is an n-dimensional vector and interactions from 1 to n are the respective components of P. Thus, a navigational pattern vector $P_i$ defined based on a sequence in which a customer interacts with types of web pages may be written as is shown in Equation (2) below:

$$P_i = (A, B, C, D) \quad (2)$$

where A, B, C and D represent types of web pages with which a customer may interact, such as a gateway home page, a search results page, a category results page, an item detail page or product detail page, a checkout page or a shopping cart page, as is shown in FIG. 8. Similarly, a vector $P_j$ representative of a navigational pattern may be defined based on a sequence in which a customer interacts with specific web pages may be written as is shown in Equation (3) below:

$$P_j = (A, C_1, D_2, F_1, E) \quad (3)$$

where A, $C_1$, $D_2$, $F_1$ and E represent specific web pages with which a customer interacts, i.e., searches for specific keywords or viewing of specific item detail pages, such as the pattern 820 shown in FIG. 8.

As is also discussed above, in addition to specific pages, a vector $P_k$ representative of a navigational pattern may further include information regarding times at which certain interactions are provided, such as is shown in Equation (4) below:

$$P_k = (A(t_1), B(t_2), C(t_3), D(t_4)) \quad (4)$$

where A, B, C and D represent types of web pages with which a customer may interact, and where $t_1$, $t_2$, $t_3$ and $t_4$ represent the times at which the customer interacted with each page. Finally, as is also discussed above, a vector $P_l$ representative of a navigational pattern may also include information such as computing platforms or software applications from which such interactions are received, such as is shown in Equation (5) below:

$$P_l = (A(t_1), B(t_2), C(t_3), D(t_4), \text{platform}_x, \text{application}_y) \quad (5)$$

where platform and application identify the respective computing $\text{platform}_x$ and/or $\text{application}_y$ from which the user interactions $A(t_1)$, $B(t_2)$, $C(t_3)$, $D(t_4)$ were received.

Any additional information, data or variables may be incorporated into a navigational vector in accordance with the systems and methods disclosed herein, and the foregoing exemplary navigational pattern vectors and equations are not intended to limit the scope of this application in any way.

Once a plurality of navigational patterns are generated based on previously recorded interactions of customers of an online marketplace with one or more web pages, and each navigation pattern is associated with at least one item, such patterns and their associated items may be used to train a classifier or other statistical algorithm to recognize that such patterns may be associated, or may not be associated, with the purchase of the associated items. For example, a training set of the patterns and the associated items may be provided to the classifier or other algorithm as inputs and outputs, respectively, in order to train the classifier or other algorithm to recognize the association between the patterns and the respectively associated items. The classifier or algorithm may be trained to recognize when a pattern is, or is not, followed by a purchase of an item, or when a pattern is associated with any other type or form of activity regarding an item. The efficacy of the classifier may be determined using any statistical or mathematical tool, including a loss function such as a sum of squares of errors (or "SSE"), sometimes called a residual sum of squares (or "RSS"). Such sums may be calculated by squaring a difference between variables corresponding to an output, and a predicted value of the output, for a variety of comparisons. Other tools may include a sum of absolute errors (or "SAE"), or any other like means.

Figure 9:
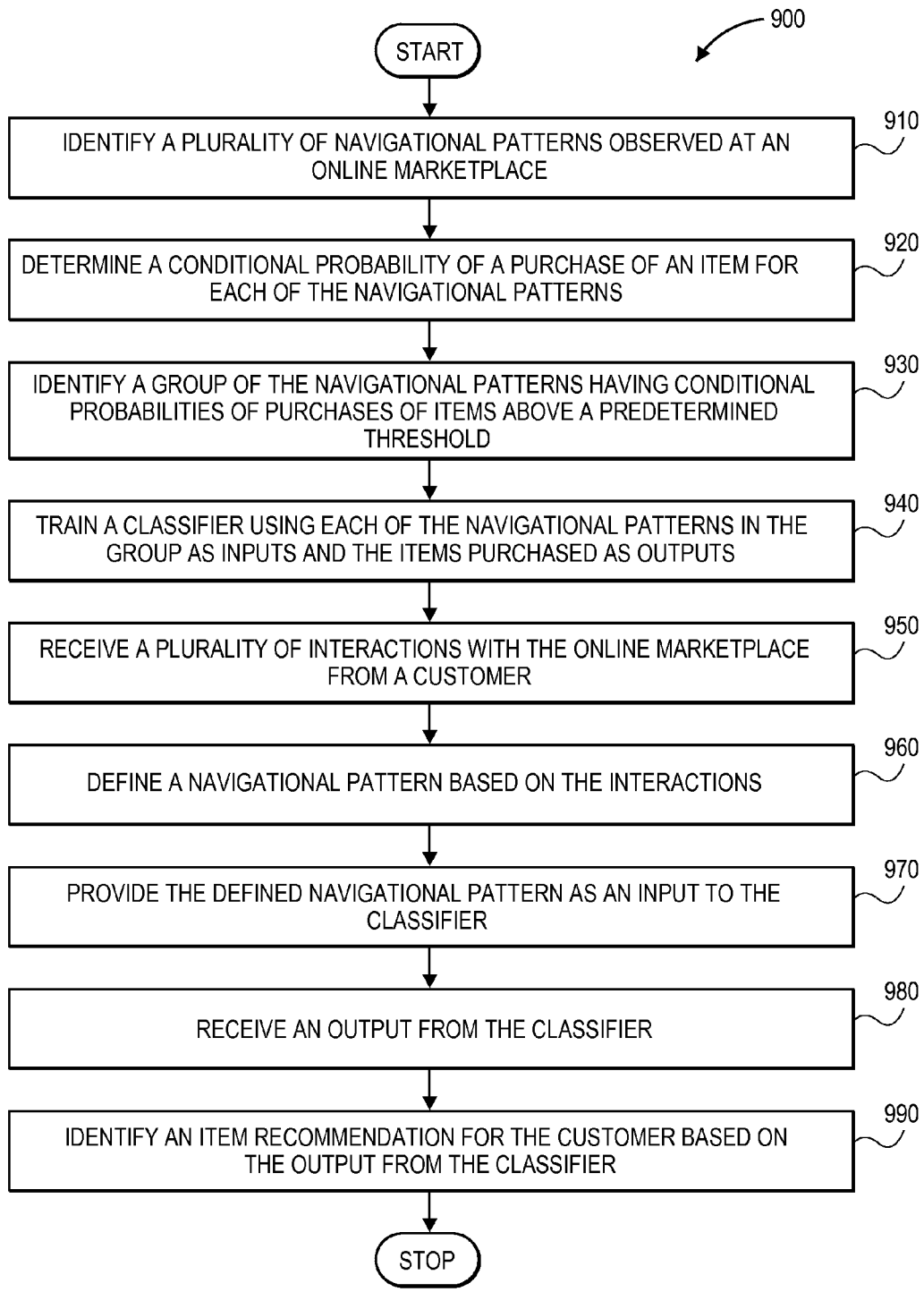
FIG. 9 is a flow chart of one method for identifying item recommendations through recognized navigational patterns, in accordance with embodiments of the present disclosure.

Thereafter, a navigational pattern may be defined based on interactions observed from a customer in the future and compared to one or more of the patterns, such as by providing the pattern to a trained classifier. Where the navigational pattern defined based on the observed interactions is consistent with one or more of the navigational patterns defined based on the previously recorded interactions and associated with one or more items, an item recommendation may be identified for the customer based at least in part on the associated items. Referring to FIG. 9, a flow chart 900 of one process for identifying item recommendations through recognized navigational patterns in accordance with embodiments of the present disclosure is shown.

At step 910, a plurality of navigational patterns that have been observed at an online marketplace is identified. For example, as is discussed above, the navigational patterns may be defined based on at least one interaction with a web page, and may be augmented with any additional information, such as a time at which each interaction is received, a specific item or category of items for which the interaction is targeted, or any other factor. At step 920, a conditional probability of a purchase of an item for each of the navigational patterns may be determined. The end results of each of the navigational patterns may be identified, and the respective probabilities of the purchases of items following each navigational pattern may be determined by any means or method. For example, the conditional probabilities of each of the interactions in a navigational pattern that resulted in the purchase of an item may be used to determine the conditional probability of the purchase of the item following the navigational pattern. Alternatively, Bayes' Theorem may be used to calculate the respective conditional probabilities.

At step 930, a group of the navigational patterns having conditional probabilities of purchases of items above a predetermined threshold may be identified. Such a threshold may be used to distinguish statistically meaningless navigational patterns that result in the purchase of at least one item (e.g., noise) from those patterns that result with a discernible regularity and also result in the purchase of at least one item, and may be defined on any basis. Alternatively, another group of the navigational patterns having conditional probabilities below a predetermined threshold may also be identified, and may be used to identify patterns that do not regularly result in purchases of items.

At step 940, a classifier may be trained using the navigational patterns in the group as inputs and the items that were respectively purchased following such patterns purchased as outputs. For example, a plurality of vectors representative of navigational patterns in the group, such as one or more of the vectors shown in Equations (1) through (5) above, or any other vectors, may be provided as a training set to a classifier, and the classifier may be trained to assign a label, in the form of the associated item, to the vector. The classifier may be linear or non-linear in nature, and may operate in any number of dimensions. Each component of the respective vectors may be considered with respect to a quantitative value representative thereof, a binary value (i.e., 0 or 1), or in any other manner.

At step 950, a plurality of interactions may be received from a customer visiting the online marketplace. Such interactions may include any of the interactions discussed above with regard to the web pages 210, 310, 410, 510, 610 of FIGS. 2-6 or any other form of interaction. At step 960, a navigational pattern may be defined based on the interactions. For example, any of the interactions observed at step 950 may be combined into a pattern, or into a vector representative of such a pattern, which may be further augmented with any additional information regarding the respective interactions, including but not limited to any keywords, categories or items associated therewith.

At step 970, the defined navigational pattern may be provided as an input to the trained classifier, and at step 980, an output may be received from the classifier. For example, upon training the classifier at step 940 to assign a label to a navigational pattern that is consistent with an item purchased as a result of the navigational pattern, the navigational pattern defined at step 960 may be provided to the classifier in order to receive an output therefrom. At step 990, an item recommendation is identified for the customer based at least in part on the output, and the process ends. For example, the item recommendation may be the same item as was previously purchased following the execution of a similar pattern by a different customer, or another item that may be related to that item.

Accordingly, by training a classifier with historically observed navigational patterns and items associated therewith, and defining a navigational pattern based at least in part on interactions observed from a customer, the systems and methods of the present disclosure may be used to identify item recommendations for the customer that are consistent with the defined navigational pattern. Such item recommendations may be utilized and displayed to customers in any manner, and may be coupled with existing methods for identifying item recommendations, or any other function.

Figure 10:
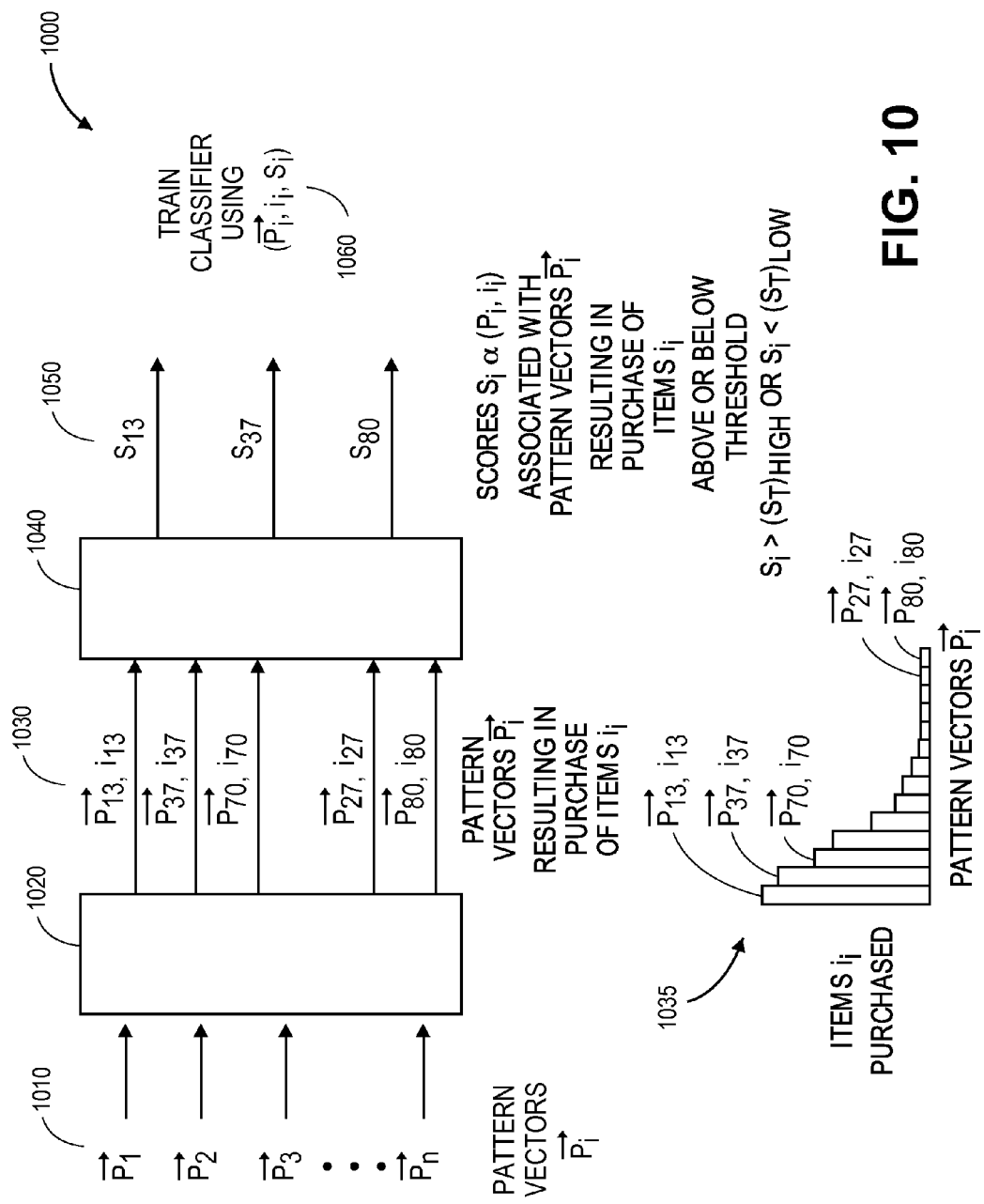
FIG. 10 depicts a flow of data according to one method for identifying item recommendations through recognized navigational patterns, in accordance with embodiments of the present disclosure.

As is discussed above, vectors may be generated based on navigational patterns and coupled with any additional information in identifying an item recommendation. For example, where vectors are generated based on each of a plurality of navigational patterns is defined based on a plurality of user interactions with at least one web page, such vectors may be combined with, or may further include, an identifier of the item as well as any variable or metric indicative of a relationship between the pattern and the item. Referring to FIG. 10, a flow diagram 1000 of data regarding the relationships between navigational patterns and individual items is shown.

As is shown in FIG. 10, a plurality 1010 of pattern vectors $P_i$ corresponding to n sessions at an online marketplace shown. The plurality 1010 of pattern vectors (or $P_i$) is further filtered at 1020 to remove all but the vectors having the highest and lowest associations with purchases of items. The vectors that are filtered at 1020 may then be augmented with an identifier of the item purchased following such patterns at 1030. For example, the histogram 1035 shows the numbers of purchases of items for each of the corresponding pattern vectors. From the augmented vectors 1030 (or $P_i$, $i_i$), a score (or $S_i$) indicative of the relationship between the respective vectors and the purchased items may be calculated at 1040, and the scores 1050 may be used to train 1060 a classifier along with the augmented vectors 1030.

Figure 11:
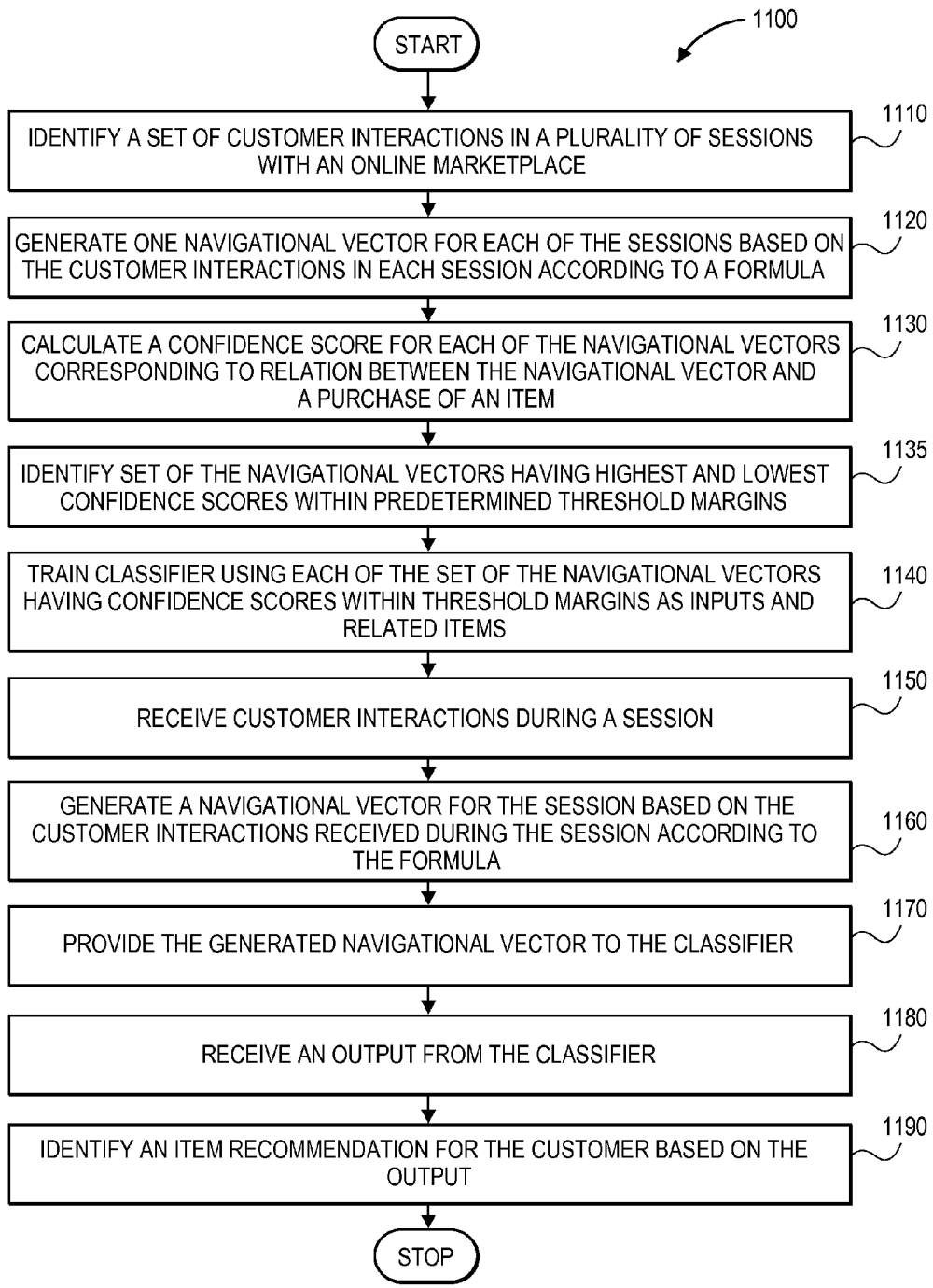
FIG. 11 is a flow chart of one method for identifying item recommendations through recognized navigational patterns, in accordance with embodiments of the present disclosure.

In such a manner, a quantitative score indicative of a likelihood that a navigational pattern will result in the purchase of a specific item may be calculated, and the quantitative score may be considered along with a vector representative of the navigational pattern in training a classifier to identify recommendations of items to within acceptable levels of error or tolerances. Referring to FIG. 11, a flow chart 1100 of one process for identifying item recommendations through recognized navigational patterns in accordance with embodiments of the present disclosure is shown.

At step 1110, a set of customer interactions with an online marketplace in a plurality of sessions is identified, and at step 1120, a navigational vector is generated according to a formula for each of the sessions based on the customer interactions in each session. For example, in each session, a customer's specific interactions with the various web pages of an online marketplace may be stored in a data store, and for each session, a navigational vector representative of such interactions may be generated according to a formula, such as one or more of the Equations (1)-(5) shown above, or any other formula. In this regard, each of the navigational vectors may be normalized and consistently compared to one another with respect to a common formula.

At step 1130, a confidence score may be calculated for each of the navigational vectors corresponding to a relation between the respective vectors and the purchases of items. Calculating such a score may be weighted based at least in part on the proximity of each interaction to the ultimate execution of a purchase of an item (i.e., a more distant or later interaction may be weighted less heavily than a more proximate or earlier interaction) or on any other factor.

At step 1135, a set of navigational vectors having confidence scores within predetermined threshold margins may be identified. For example, a threshold margin of ten percent (10%) would identify the navigational vectors having the highest and lowest, respectively, ten percent of confidence scores indicating relationships between such vectors and purchases of items. Such a threshold margin may be utilized to identify reference points at which each of the scores calculated at step 1130 indicates that an observed navigational pattern is sufficiently related, or sufficiently unrelated, to the purchase of an item. At step 1140, a classifier may be trained using each of the navigational vectors having confidence scores as inputs that are above and below the threshold margins as inputs, and the items purchased as outputs. In this regard, the classifier may be trained to associate the navigational patterns represented by the vectors with likely purchases of the associated items, or unlikely purchases of the associated items.

At step 1150, a customer's interactions with the online marketplace may be received, and at step 1160, a navigational vector for the session may be generated based on the interactions received from the customer according to the formula. Thus, the received interactions may be considered in the same manner as the interactions of the historical sessions that were identified at step 1110. At step 1170, the generated vector is provided to the classifier, which was trained using the generated navigational vectors, confidence scores and items purchased at step 1140, and at step 1180, an output is received from the classifier. Such an output may take the form of an item, a category of items, or any other attribute that may be related to an item, based on the results of the training. At step 1190, an item recommendation is identified based on the output of the classifier, and the process ends.

As is discussed above, a classifier or other statistical algorithm may be trained to recognize associations between customer interactions and items, such as by providing a first group or set of historically observed patterns of interactions (e.g., a training set) and items with which the patterns of the first group or set are associated to a classifier as inputs and outputs, either in series or in parallel. The classifier's capacity to recognize such associations may be validated by providing a second group or set of historically observed patterns of interactions (e.g., a test set) to the classifier.

By evaluating the classifier using one or more patterns that are different from the patterns that were used to train the classifier, i.e., by training and evaluating the classifier using different sets of patterns, a more accurate and relevant measure of the classifier's performance may be obtained. Training a classifier causes the classifier to recognize patterns expressed in the data, i.e., correlations or connections between the training inputs and the training outputs. Thus, where the goal is to train a classifier to recognize a pattern that may be observed in the future as corresponding to a predicted activity, such as a purchase of an item, evaluating the classifier using one of the training inputs may result in an identification of the training output associated with the training input based not on the merits, but upon a recognition of the training input as directly associated with the training output. Therefore, a separate and distinct set of patterns for evaluating the classifier's performance should be reserved for the purposes of periodically monitoring the training progress.

Figure 12:
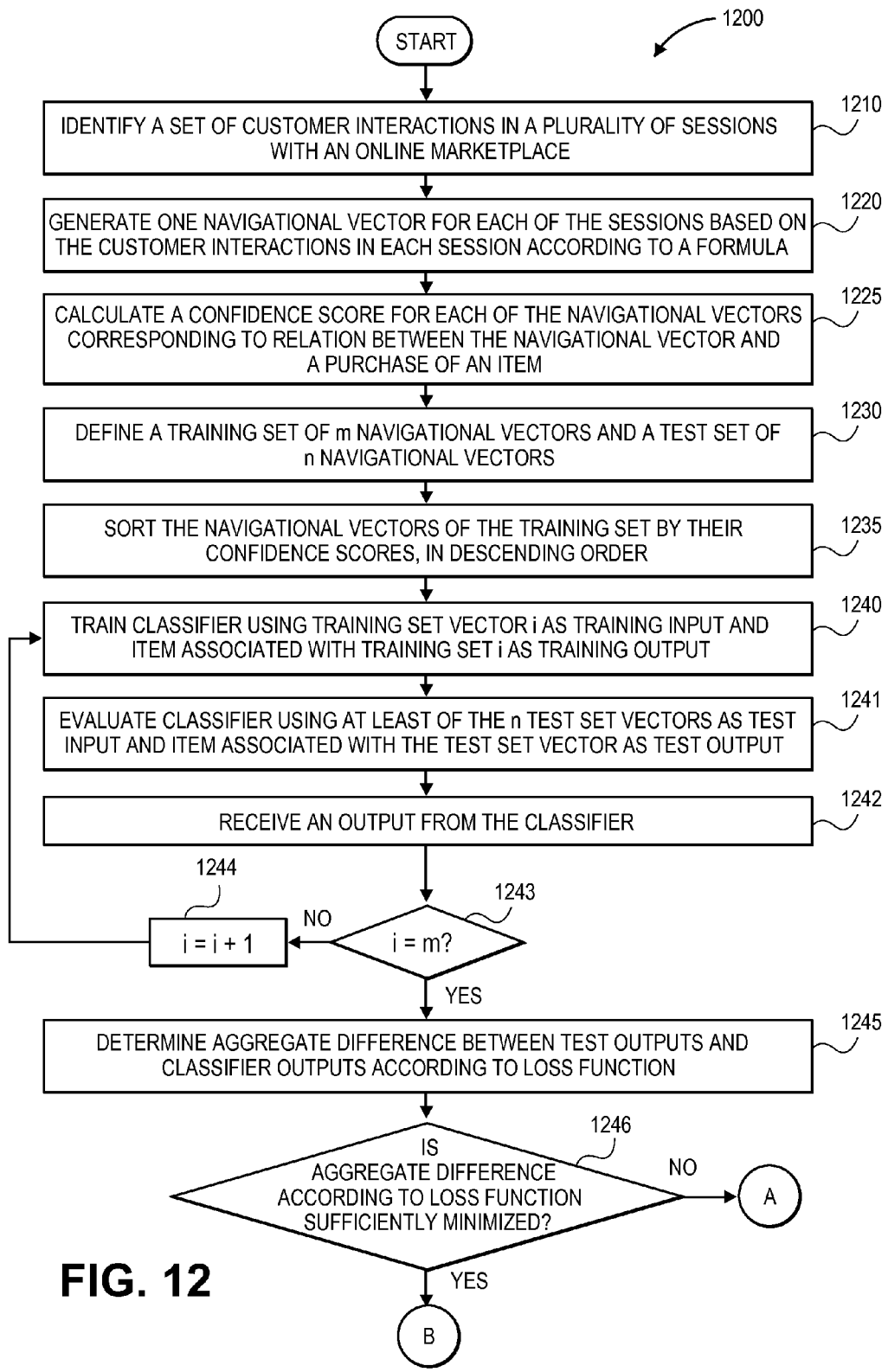
FIG. 12 is a flow chart of one method for identifying item recommendations through recognized navigational patterns, in accordance with embodiments of the present disclosure.
Figure 12:
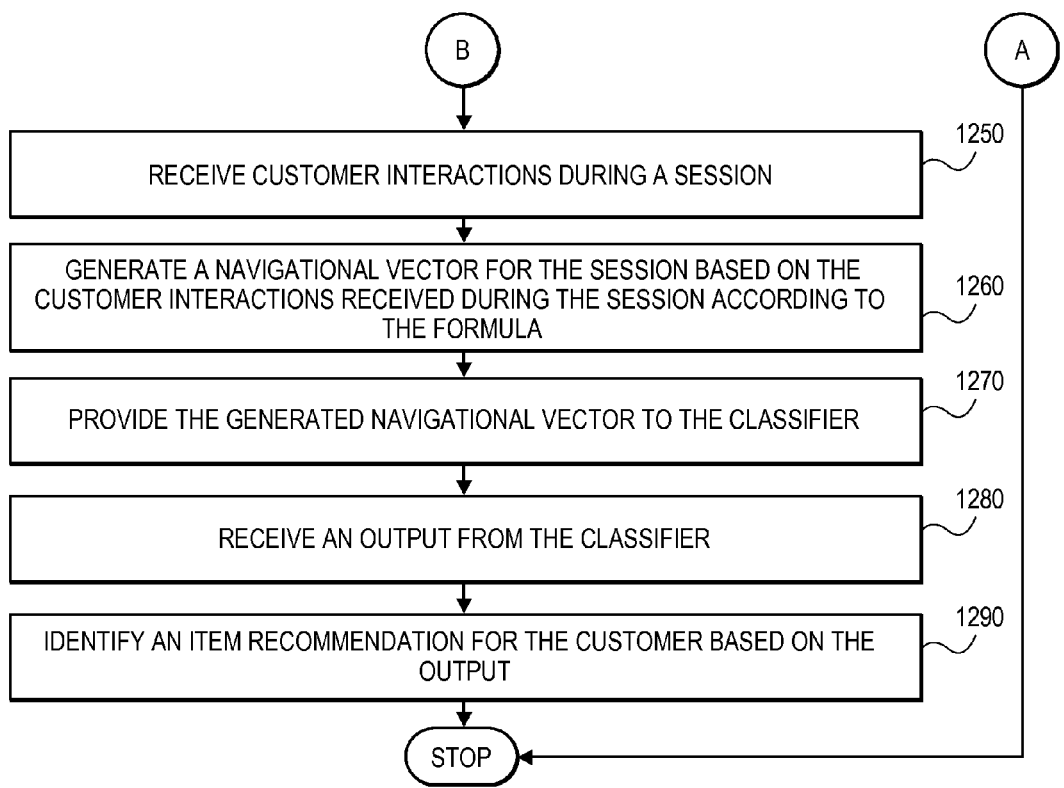

Once a classifier is able to identify items with which the patterns of interactions in the second group or set are associated, to a predetermined degree, tolerance or confidence level, the classifier may be deemed sufficiently trained and able to identify items which may be recommended, or should not be recommended, to a customer based on his or her interactions with one or more web sites. Referring to FIG. 12, a flow chart 1200 of one process for identifying item recommendations through recognized navigational patterns in accordance with embodiments of the present disclosure is shown. At step 1210, a set of customer interactions in a plurality of sessions at an online marketplace is identified, and at step 1220, a navigational vector is generated for each of the sessions according to a formula. For example, such interactions with one or more elements of the various web pages at an online marketplace within a viewing session may be captured, and a vector summarizing such interactions may be generated.

At step 1225, a confidence score may be calculated for each of the navigational vectors corresponding to a relation between each of the navigational vectors and a purchase of an item. For example, if a navigational vector is sufficiently related to such a purchase, or sufficiently unrelated with a purchase, the extent of such a relation may be represented in a confidence score for the vector, where a high confidence score is indicative of a strong relation between the vector and an affirmative response (i.e., a purchase or no purchase) relating to the item, and a low confidence score is indicative of a weak relation between the vector and the affirmative response.

At step 1230, a training set of m navigational vectors and a test set of n navigational vectors is defined, and at step 1235, the m navigational vectors of the training set are sorted by their confidence scores, in descending order. For example, referring to FIG. 10, where confidence scores $S_i$ are calculated based on the associations between a vector $P_i$ and an item the vectors $P_i$ may be sorted based on the values of $S_i$.

At step 1240, the classifier is trained using a first one of the m vectors, or vector i, as a training input and an item associated with the one of the m vectors as a training output. By providing the training set vectors to the classifier along with associated items, the classifier may be trained to recognize the features, attributes or aspects of the patterns as associated with one or more items. At step 1241, the classifier may be evaluated using at least one of the n test set vectors as a test input and the item associated with the one of the n test vectors as a test output, and at step 1242, an output may be received from the classifier in response to the test input.

At step 1243, the system determines whether each of the m vectors has been used to train the classifier, i.e., whether i=m. If any of the vectors have not been used to train the classifier, i.e., if i<m, then the process advances to step 1244, where the value of i is incremented by 1, before returning to step 1240, where the classifier is trained using training vector i as an input and an item associated with training vector i as an output. If each of the vectors has been used to train the classifier, i.e., if i=m, then the process advances to step 1245, where an aggregate difference between the test outputs and the classifier outputs identified at steps 1241 and 1242 is determined. At step 1246, if the aggregate difference determined according to the loss function is not sufficiently minimized (i.e., to within a predetermined tolerance), then the process ends.

If the aggregate difference determined according to the loss function is sufficiently minimized, then the process advances to step 1250, where interactions with the online marketplace during a session are received from a customer. At step 1260, a navigational vector is generated for the session based on the customer interactions, according to the formula. At step 1270, the generated navigational vector is provided to the trained classifier, and at step 1280, an output is received from the trained classifier. At step 1290, an item recommendation is identified for the customer, and the process ends.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Any means or methods for comparing navigational patterns to one another, or for identifying associations between navigational patterns and items, may be utilized in accordance with the present disclosure.

For example, the systems and methods of the present disclosure may be utilized with regard to patterns of interactions with not only web pages but also one or more dedicated shopping applications that may also be maintained by the online marketplace. Moreover, although each of the patterns shown in FIG. 8 begins with a viewing of a gateway page 811, 821, 831, 841, 851, the systems and methods disclosed herein are not so limited, and those of ordinary skill in the pertinent art would recognize that a navigational pattern may be identified as beginning with a selection of a hyperlinked advertisement or other feature expressed in an electronic message (e.g., an E-mail sent to one or more customers).

Furthermore, once a similarity or commonality is identified between an observed navigational pattern and one or more historical navigational patterns, an item recommendation may be determined by any means. For example, where a series of interactions by a customer is observed, and a navigational pattern that has previously been associated with the purchase of baseball-related items is defined based on such interactions, item recommendations of baseballs, baseball bats or baseball cards may be provided to the customer who executed the series of interactions. Moreover, processes for identifying item recommendations for a customer may incorporate any data or information that may be known regarding the customer's preferences or possessions. For example, where an output from a classifier, such as the output received at step 980 of the process shown in the flow chart 900 of FIG. 9 or at step 1180 of the process shown in the flow chart 1100 of FIG. 11, suggests that a customer may be interested in an item that he or she already owns, a similar or related item (e.g., an accessory to the item) may be recommended to the customer. Alternatively, where the output suggests that the customer may be interested in an item having multiple variants, and it may be determined based on his or her purchasing history that the customer is interested in a particular variant, a recommendation of the particular variant of the item may be provided to the customer.

Those of ordinary skill in the pertinent art would further recognize that the systems and methods disclosed herein may conduct one or more calculations or determinations in one or more offline or online processes (i.e., in back-end or in front-end processes). For example, with regard to the embodiment represented in the flow chart 700 of FIG. 7, the steps 710-740 may be performed in one or more offline processes, while the steps 750-780 may be performed in one or more online processes, as necessary. Furthermore, the systems and methods may analyze the interactions of a customer with one or more web pages in real time or in near-real time, as necessary, and may take any steps with regard to the identification of item recommendations as navigational patterns are identified.

Moreover, although some of the embodiments disclosed herein may identify item recommendations based on navigational patterns that resulted in the purchase of an item, the systems and methods of the present disclosure are not so limited. For example, an item recommendation may be identified for a customer based on a navigational pattern that results in the addition of an item to a wish list or shopping cart, even if that customer never ultimately purchases the item. Additionally, the various calculations, identifications and determinations described herein may be performed in one or more server-side applications, in one or more client-side applications, or in a combination of server-side and client-side applications in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIG. 7, 9, 11 or 12, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method comprising:
identifying, by the at least one computer processor, a plurality of customer sessions at an online marketplace, wherein each of the customer sessions comprises a plurality of user interactions with at least one of a plurality of pages hosted by the online marketplace received from one of the plurality of customers, and wherein each of the customer sessions resulted in a purchase of at least one item by the one of a plurality of customers;
defining, by the at least one computer processor, historical navigational patterns for each of the customer sessions, wherein each of the historical navigational patterns is defined based on locations and times of each of the user interactions received during one of the customer sessions;
determining, by the at least one computer processor, the at least one item purchased during each of the customer sessions;
defining, by the at least one computer processor, a training set comprising information regarding at least some of the historical navigational patterns defined for each of the customer sessions as training inputs and information regarding the at least one item purchased during each of the customer sessions as training outputs;
training, by the at least one computer processor, at least one statistical algorithm to associate navigational patterns with items purchased using the training inputs and the training outputs;
capturing, over the network by the at least one computer processor, a first plurality of user interactions with at least one page hosted by the online marketplace by a first customer;
defining, by the at least one computer processor, a navigational pattern based at least in part on the first plurality of user interactions, wherein the defined navigational pattern is based at least in part on locations and times of each of the first plurality of user interactions with the at least one page by the first customer;
providing information regarding the defined navigational pattern to the at least one trained statistical algorithm as an input by the at least one computer processor;
receiving information regarding
at least one item as an output from the at least one trained statistical algorithm, by the at least one computer processor; and
storing an association of the first customer and the information regarding the at least one item in at least one data store,
wherein each of the first plurality of user interactions is at least one of:
an entry of a keyword into a text box by the first customer;
a selection of a category by the first customer;
a selection of a radio button by the first customer;
a selection of at least one entry in a drop-down menu by the first customer;
an entry of at least one of a user name or a password by the first customer;
an identification of a shipping address by the first customer;
an identification of a financial instrument by the first customer;
a zoom action initiated by the first customer; or
a pan action initiated by the first customer.

2. The computer-implemented method of claim 1, further comprising:
identifying an item recommendation based at least in part on the association of the first customer and the information regarding the at least one item by the at least one computer processor; and
at least one of:
causing a display of the item recommendation to the first customer by the at least one computer processor; or
initiating an electronic communications campaign by the at least one computer processor.

3. The computer-implemented method of claim 2, wherein the item recommendation relates to a bundle of at least two of the plurality of items.

4. The computer-implemented method of claim 1, wherein defining the navigational pattern based at least in part on the first plurality of user interactions with the at least one page by the first customer comprises:
sorting the first plurality of user interactions with the at least one page hosted by the marketplace according to an order based at least in part on the times of each of the first plurality of user interactions by the at least one computer processor,
wherein the navigational pattern is defined based at least in part on the order.

5. The computer-implemented method of claim 1, wherein defining the training set comprises:
calculating, by the at least one computer processor, a vector for each of the at least some of the historical navigational patterns according to a formula, wherein the information regarding the at least some of the historical navigational patterns comprises the vectors calculated for the at least some of the historical navigational patterns,
wherein the method further comprises:
calculating, by the at least one computer processor, a vector for the defined navigational pattern according to the formula, wherein the information regarding the defined navigational pattern provided to the at least one trained statistical algorithm as the input comprises the vector calculated for the defined navigational pattern.

6. A computer-implemented method comprising:
capturing, by at least one computer processor, a plurality of user interactions over a network, wherein each of the plurality of user interactions occurs at a time and with a location on at least one page hosted by an online marketplace or a shopping application associated with the online marketplace;
defining, by the at least one computer processor, a navigational pattern based at least in part on the times and the locations of each of the plurality of user interactions;
identifying, by the at least one computer processor, a plurality of historical navigational patterns, wherein each of the plurality of historical navigational patterns is associated with a prior customer session, and wherein each of the plurality of historical navigational patterns is defined by at least one time and at least one location of at least one prior user interaction during the prior customer session;

determining, for each of the plurality of historical navigational patterns, a conditional probability of a purchase of at least one item by the at least one computer processor;

identifying a subset of the historical navigational patterns, wherein the conditional probability of the purchase of the at least one item for each of the historical navigational patterns in the subset exceeds a predetermined threshold;

determining a comparison of the navigational pattern to each of the historical navigational patterns in the subset by the at least one computer processor;

selecting one of the historical navigational patterns in the subset based at least in part on the comparison, by the at least one computer processor;

identifying at least one item associated with the selected historical navigational pattern, by the at least one computer processor; and storing an association of the customer and the at least one item associated with the selected historical navigational pattern in at least one data store, wherein each of the plurality of user interactions is at least one of:
- an entry of a keyword into a text box on the at least one page;
- a selection of a category on the at least one page;
- a selection of a radio button on the at least one page;
- a selection of at least one entry in a drop-down menu on the at least one page;
- an entry of at least one of a user name or a password on the at least one page;
- an identification of a shipping address on the at least one page;
- an identification of a financial instrument on the at least one page;
- a zoom action on the at least one page; or
- a pan action on the at least one page.

7. A computer-implemented method comprising:

capturing, by at least one computer processor, a plurality of user interactions over a network, wherein each of the plurality of user interactions occurs at a time and with a location on at least one page hosted by an online marketplace or a shopping application associated with the online marketplace;

defining, by the at least one computer processor, a navigational pattern based at least in part on the plurality of user interactions;

identifying, by the at least one computer processor, a plurality of historical navigational patterns, wherein each of the plurality of historical navigational patterns is associated with a prior customer session, and wherein each of the plurality of historical navigational patterns is defined by at least one time and at least one location of at least one prior user interaction during the prior customer session;

determining, by the at least one computer processor, a number of items purchased during the prior customer session associated with each of the historical navigational patterns, by the at least one computer processor;

identifying a purchase threshold;

identifying, by the at least one computer processor, a subset of the historical navigational patterns, wherein each of the historical navigational patterns in the subset is associated with a customer session having a number of items purchased in excess of the purchase threshold;

determining a comparison of the navigational pattern to each of the historical navigational patterns in the subset by the at least one computer processor;

selecting one of the historical navigational patterns in the subset based at least in part on the comparison, by the at least one computer processor;

identifying at least one item associated with the selected historical navigational pattern, by the at least one computer processor; and storing an association of the customer and the at least one item associated with the selected historical navigational pattern in at least one data store, wherein each of the plurality of user interactions is at least one of:
- an entry of a keyword into a text box on the at least one page;
- a selection of a category on the at least one page;
- a selection of a radio button on the at least one page;
- a selection of at least one entry in a drop-down menu on the at least one page;
- an entry of at least one of a user name or a password on the at least one page;
- an identification of a shipping address on the at least one page;
- an identification of a financial instrument on the at least one page;
- a zoom action on the at least one page; or
- a pan action on the at least one page.

8. A computer-implemented method comprising:

capturing, by at least one computer processor, a plurality of user interactions with at least one page of an online marketplace or a shopping application;

defining, by the at least one computer processor, a navigational pattern based at least in part on the plurality of user interactions;

calculating, by the at least one computer processor, a vector for the defined navigational pattern, wherein the vector is calculated based at least in part on locations and times of each of the plurality of user interactions with the at least one page of the online marketplace or the shopping application;

identifying, by the at least one computer processor, a plurality of historical navigational patterns, wherein each of the plurality of historical navigational patterns is defined based at least in part on a plurality of prior user interactions with pages of the online marketplace or the shopping application;

calculating, by the at least one computer processor, a vector for each of the plurality of historical navigational patterns, wherein each of the vectors is calculated based at least in part on locations and times of the plurality of prior user interactions from which the historical navigational pattern was defined;

identifying, by the at least one computer processor, at least one item associated with each of the vectors;

defining, by the at least one computer processor, a training set comprising at least some of the vectors and the at least one item associated with each of the vectors in the training set;

training, by the at least one computer processor, the classifier to assign labels corresponding to items to vectors according to the training set, by the at least one computer processor providing, by the at least one computer processor, an input comprising the vector for the defined navigational pattern to the trained classifier;

receiving, by the at least one computer processor, an output comprising a label corresponding to at least one item from the trained classifier as an output; and storing an association of the customer and the at least one item corresponding to the label in at least one data store, wherein each of the plurality of user interactions with the at least one page is at least one of:

an entry of a keyword into a text box on the at least one page;

a selection of a category on the at least one page;

a selection of a radio button on the at least one page;

a selection of at least one entry in a drop-down menu on the at least one page;

an entry of at least one of a user name or a password on the at least one page;

an identification of a shipping address on the at least one page;

an identification of a financial instrument on the at least one page;

a zoom action on the at least one page; or a pan action on the at least one page.

9. The computer-implemented method of claim 8, further comprising:

calculating a confidence score for each of the vectors in the training set by the at least one computer processor, wherein the confidence score is indicative of an association between each of the vectors and the at least one item, wherein each of the vectors in the training set has a confidence score above a first predetermined threshold or below a second predetermined threshold.

10. The computer-implemented method of claim 8, wherein training the classifier to assign labels corresponding to items to vectors according to the training set comprises:

calculating a confidence score for each of the vectors in the training set by the at least one computer processor, wherein the confidence score is indicative of an association between each of the vectors in the training set and the at least one item;

sorting each of the vectors in the training set according to the confidence scores by the at least one computer processor;

selecting a first vector from the sorted training set, wherein the first vector has a highest confidence score;

providing the first vector to the classifier as a training input;

providing the at least one item associated with the first vector to the classifier as a training output;

defining a test set comprising at least some of the vectors as test inputs and the at least one item associated with each of the vectors in the test set as test outputs by the at least one computer processor, wherein none of the vectors in the training set is included in the test set;

providing one of the test set vectors to the classifier as a test input by the at least one computer processor;

receiving an output from the classifier using by the at least one computer processor; and comparing the classifier output to the test output corresponding to the test input, by the at least one computer processor;

determining that a difference between the classifier output and the test output exceeds a predetermined tolerance, selecting a second vector from the sorted training set, wherein the second vector has the next-highest confidence score;

providing the second vector to the classifier as a training input; and providing the at least one item associated with the second vector to the classifier as a training output.

* * * * *

UNITED STATES PATENT AND TRADEMARK OFFICE
CERTIFICATE OF CORRECTION

PATENT NO. : 9,691,096 B1
APPLICATION NO. : 14/027848
DATED : June 27, 2017
INVENTOR(S) : Siyang Dai Page 1 of 1

It is certified that error appears in the above-identified patent and that said Letters Patent is hereby corrected as shown below:

In the Claims

Column 30:
Line 23, Claim 10, "receiving an output from the classifier using by the at least" should read as,
--receiving an output from the classifier by the at least--.

Signed and Sealed this
Eighth Day of November, 2022

Katherine Kelly Vidal
*Director of the United States Patent and Trademark Office*